US010464023B2

(12) United States Patent
Benton et al.

(10) Patent No.: US 10,464,023 B2
(45) Date of Patent: Nov. 5, 2019

(54) SEPARATION SYSTEMS, ELEMENTS, AND METHODS FOR SEPARATION UTILIZING STACKED MEMBRANES AND SPACERS

(71) Applicant: Porifera, Inc., Hayward, CA (US)

(72) Inventors: Charles Benton, Berkeley, CA (US); Olgica Bakajin, Berkeley, CA (US)

(73) Assignee: Porifera, Inc., Hayward, CA (US)

( * ) Notice: Subject to any disclaimer, the term of this patent is extended or adjusted under 35 U.S.C. 154(b) by 280 days.

(21) Appl. No.: 15/470,757

(22) Filed: Mar. 27, 2017

(65) Prior Publication Data

US 2017/0197181 A1    Jul. 13, 2017

Related U.S. Application Data

(62) Division of application No. 14/137,903, filed on Dec. 20, 2013, now Pat. No. 9,636,635.

(Continued)

(51) Int. Cl.
| | |
|---|---|
| *B01D 63/08* | (2006.01) |
| *B01D 61/00* | (2006.01) |
| *C02F 1/44* | (2006.01) |

(52) U.S. Cl.
CPC ........ *B01D 63/082* (2013.01); *B01D 61/002* (2013.01); *B01D 63/084* (2013.01); *B01D 63/085* (2013.01); *C02F 1/445* (2013.01); *B01D 2313/14* (2013.01); *B01D 2319/00* (2013.01); *B01D 2319/02* (2013.01); *B01D 2319/04* (2013.01)

(58) Field of Classification Search
CPC .. B01D 63/082; B01D 63/085; B01D 63/084; B01D 61/002; B01D 2313/14; B01D 2319/04; B01D 2319/02; B01D 2319/00; C02F 1/445
See application file for complete search history.

(56) References Cited

U.S. PATENT DOCUMENTS

| | | | |
|---|---|---|---|
| 3,352,422 | A | 11/1967 | Heden |
| 3,721,621 | A | 3/1973 | Hough |

(Continued)

FOREIGN PATENT DOCUMENTS

| | | |
|---|---|---|
| CA | 2785807 A1 | 7/2011 |
| CN | 101228214 A | 7/2008 |

(Continued)

OTHER PUBLICATIONS

First office action received for Australian Appl. No. 2013364069 dated May 2, 2017.

(Continued)

*Primary Examiner* — John Kim
(74) *Attorney, Agent, or Firm* — Dorsey & Whitney LLP

(57) ABSTRACT

An example separation system includes a stack of membrane plate assemblies. An example membrane plate assembly may include membranes bonded to opposite sides of a spacer plate. The spacer plate may include a first opening in fluid communication with a region between the membranes, and a second opening in fluid communication with a region between membrane plate assemblies. Adjacent membrane plate assemblies in the stack may have alternating orientations such that bonding areas for adjacent membranes in the stack may be staggered. Accordingly, two isolated flows may be provided which may be orthogonal from one another.

6 Claims, 24 Drawing Sheets

Related U.S. Application Data

(60) Provisional application No. 61/745,300, filed on Dec. 21, 2012.

(56) References Cited

U.S. PATENT DOCUMENTS

| | | |
|---|---|---|
| 4,326,509 A | 4/1982 | Usukura |
| 4,428,720 A | 1/1984 | Van Erden et al. |
| 4,454,176 A | 6/1984 | Buckfelder et al. |
| 4,618,533 A | 10/1986 | Steuck |
| 4,756,835 A | 7/1988 | Wilson |
| 4,792,402 A | 12/1988 | Fricker |
| 4,900,443 A | 2/1990 | Wrasidlo |
| 5,084,220 A | 1/1992 | Moller |
| 5,100,556 A | 3/1992 | Nichols |
| 5,192,434 A | 3/1993 | Moller |
| 5,238,574 A | 8/1993 | Kawashima et al. |
| 5,593,738 A | 1/1997 | Ihm et al. |
| 6,261,879 B1 | 7/2001 | Houston et al. |
| 6,406,626 B1 | 6/2002 | Murakami et al. |
| 6,413,070 B1 | 7/2002 | Meyering et al. |
| 6,513,666 B2 | 2/2003 | Meyering et al. |
| 6,755,970 B1 | 6/2004 | Knappe et al. |
| 6,849,184 B1 | 2/2005 | Lampi et al. |
| 6,884,375 B2 | 4/2005 | Wang et al. |
| 6,992,051 B2 | 1/2006 | Anderson |
| 7,177,978 B2 | 2/2007 | Kanekar et al. |
| 7,205,069 B2 | 4/2007 | Smalley et al. |
| 7,445,712 B2 | 11/2008 | Herron |
| 7,611,628 B1 | 11/2009 | Hinds, III |
| 7,627,938 B2 | 12/2009 | Kim et al. |
| 7,799,221 B1 | 9/2010 | MacHarg |
| 7,879,243 B2 | 2/2011 | Al-Mayahi et al. |
| 7,901,578 B2 | 3/2011 | Pruet |
| 7,955,506 B2 | 6/2011 | Bryan et al. |
| 8,029,671 B2 | 10/2011 | Cath et al. |
| 8,029,857 B2 | 10/2011 | Hoek et al. |
| 8,038,887 B2 | 10/2011 | Bakajin et al. |
| 8,083,942 B2 | 12/2011 | Cath et al. |
| 8,177,978 B2 | 5/2012 | Kurth et al. |
| 8,181,794 B2 | 5/2012 | McGinnis et al. |
| 8,221,629 B2 | 7/2012 | Al-Mayahi et al. |
| 8,246,791 B2 | 8/2012 | McGinnis et al. |
| 8,252,350 B1 | 8/2012 | Cadwalader et al. |
| 8,356,717 B2 | 1/2013 | Waller, Jr. et al. |
| 8,518,276 B2 | 8/2013 | Striemer et al. |
| 8,567,612 B2 | 10/2013 | Kurth et al. |
| 8,920,654 B2 | 12/2014 | Revanur et al. |
| 8,960,449 B2 | 2/2015 | Tomioka et al. |
| 9,636,635 B2 | 5/2017 | Benton et al. |
| 9,861,937 B2 | 1/2018 | Benton et al. |
| 2002/0063093 A1 | 5/2002 | Rice et al. |
| 2002/0148769 A1 | 10/2002 | Deuschle et al. |
| 2003/0038074 A1 | 2/2003 | Patil |
| 2003/0173285 A1 | 9/2003 | Schmidt et al. |
| 2004/0004037 A1 | 1/2004 | Herron |
| 2004/0071951 A1 | 4/2004 | Jin |
| 2005/0142385 A1 | 6/2005 | Jin |
| 2006/0144789 A1 | 7/2006 | Cath et al. |
| 2006/0233694 A1 | 10/2006 | Sandhu et al. |
| 2007/0215544 A1 | 9/2007 | Kando et al. |
| 2008/0017578 A1 | 1/2008 | Childs et al. |
| 2008/0149561 A1 | 6/2008 | Chu et al. |
| 2008/0210370 A1 | 9/2008 | Smalley et al. |
| 2008/0223795 A1 | 9/2008 | Bakajin et al. |
| 2008/0236804 A1 | 10/2008 | Cola et al. |
| 2008/0237126 A1 | 10/2008 | Hoek et al. |
| 2008/0290020 A1 | 11/2008 | Marand et al. |
| 2009/0078640 A1 | 3/2009 | Chu et al. |
| 2009/0214847 A1 | 8/2009 | Maruyama et al. |
| 2009/0250392 A1 | 10/2009 | Thorsen et al. |
| 2009/0272692 A1 | 11/2009 | Kurth et al. |
| 2009/0283475 A1 | 11/2009 | Hylton et al. |
| 2009/0308727 A1 | 12/2009 | Kirts |
| 2009/0321355 A1 | 12/2009 | Ratto et al. |
| 2010/0025330 A1 | 2/2010 | Ratto et al. |
| 2010/0032377 A1 | 2/2010 | Wohlert |
| 2010/0051538 A1 | 3/2010 | Freeman et al. |
| 2010/0059433 A1 | 3/2010 | Freeman et al. |
| 2010/0062156 A1 | 3/2010 | Kurth et al. |
| 2010/0140162 A1 | 6/2010 | Jangbarwala |
| 2010/0155333 A1 | 6/2010 | Husain et al. |
| 2010/0192575 A1 | 8/2010 | Al-Mayahi et al. |
| 2010/0206743 A1 | 8/2010 | Sharif et al. |
| 2010/0206811 A1 | 8/2010 | Ng et al. |
| 2010/0212319 A1 | 8/2010 | Donovan |
| 2010/0224550 A1 | 9/2010 | Herron |
| 2010/0224561 A1 | 9/2010 | Marcin |
| 2010/0320140 A1 | 12/2010 | Nowak et al. |
| 2010/0326833 A1 | 12/2010 | Messalem et al. |
| 2011/0017666 A1 | 1/2011 | Cath et al. |
| 2011/0036774 A1 | 2/2011 | McGinnis |
| 2011/0057322 A1 | 3/2011 | Matsunaga et al. |
| 2011/0073540 A1 | 3/2011 | McGinnis et al. |
| 2011/0132834 A1 | 6/2011 | Tomioka et al. |
| 2011/0133487 A1 | 6/2011 | Oklejas, Jr. |
| 2011/0186506 A1 | 8/2011 | Ratto et al. |
| 2011/0220574 A1 | 9/2011 | Bakajin et al. |
| 2011/0284456 A1 | 11/2011 | Brozell et al. |
| 2012/0043274 A1 | 2/2012 | Chi et al. |
| 2012/0080378 A1 | 4/2012 | Revanur et al. |
| 2012/0080381 A1 | 4/2012 | Wang et al. |
| 2012/0103892 A1 | 5/2012 | Beauchamp et al. |
| 2012/0118743 A1 | 5/2012 | Liang et al. |
| 2012/0118826 A1 | 5/2012 | Liberman et al. |
| 2012/0118827 A1 | 5/2012 | Chang et al. |
| 2012/0132595 A1 | 5/2012 | Bornia |
| 2012/0160753 A1 | 6/2012 | Vora et al. |
| 2012/0231535 A1 | 9/2012 | Herron et al. |
| 2012/0234758 A1 | 9/2012 | McGinnis et al. |
| 2012/0241371 A1 | 9/2012 | Revanur et al. |
| 2012/0241373 A1 | 9/2012 | Na et al. |
| 2012/0251521 A1 | 10/2012 | Rostro et al. |
| 2012/0261321 A1 | 10/2012 | Han et al. |
| 2012/0267297 A1 | 10/2012 | Iyer |
| 2012/0267306 A1 | 10/2012 | McGinnis et al. |
| 2012/0273421 A1 | 11/2012 | Perry et al. |
| 2013/0001162 A1 | 1/2013 | Yangali-Quintanilla et al. |
| 2013/0095241 A1 | 4/2013 | Lulevich et al. |
| 2013/0105383 A1 | 5/2013 | Tang et al. |
| 2013/0126431 A1 | 5/2013 | Henson et al. |
| 2013/0203873 A1 | 8/2013 | Linder et al. |
| 2013/0220581 A1 | 8/2013 | Herron et al. |
| 2014/0015159 A1 | 1/2014 | Lazar et al. |
| 2014/0175011 A1 | 6/2014 | Benton et al. |
| 2014/0302579 A1 | 10/2014 | Boulanger et al. |
| 2014/0319056 A1 | 10/2014 | Fuchigami et al. |
| 2015/0014232 A1 | 1/2015 | McGinnis et al. |
| 2015/0014248 A1 | 1/2015 | Herron et al. |
| 2015/0064306 A1 | 3/2015 | Tatera et al. |
| 2015/0273399 A1 | 10/2015 | Roh et al. |
| 2016/0002074 A1 | 1/2016 | Benton et al. |
| 2016/0038880 A1 | 2/2016 | Benton et al. |
| 2016/0136577 A1 | 5/2016 | McGovern et al. |
| 2016/0136578 A1 | 5/2016 | McGovern et al. |
| 2016/0136579 A1 | 5/2016 | McGovern et al. |
| 2016/0230133 A1 | 8/2016 | Peterson et al. |
| 2018/0311618 A1 | 11/2018 | Benton et al. |

FOREIGN PATENT DOCUMENTS

| | | |
|---|---|---|
| CN | 102674605 A | 9/2012 |
| FR | 2189091 A1 | 1/1974 |
| JP | S55149682 A | 11/1980 |
| JP | S5959213 A | 4/1984 |
| JP | 62-14620 A | 6/1987 |
| JP | 2005-138028 A | 6/2005 |
| JP | 2012183492 A | 9/2012 |
| KR | 101144316 B1 | 5/2012 |
| KR | 101229482 B1 | 2/2013 |
| WO | 1993/010889 | 6/1993 |
| WO | 9962623 | 12/1999 |
| WO | 0213955 A1 | 2/2002 |
| WO | 2006040175 A1 | 4/2006 |
| WO | 2008/137082 A1 | 11/2008 |

(56) References Cited

FOREIGN PATENT DOCUMENTS

| WO | 2009/035415 | | 3/2009 |
|---|---|---|---|
| WO | 2009039467 | A1 | 3/2009 |
| WO | 2009129354 | A2 | 10/2009 |
| WO | 2009129354 | A3 | 10/2009 |
| WO | 2010006196 | A2 | 1/2010 |
| WO | 2010094641 | A | 4/2010 |
| WO | 2010067063 | A1 | 6/2010 |
| WO | 2010144057 | A1 | 12/2010 |
| WO | 2011028541 | A1 | 3/2011 |
| WO | 2012/047282 | | 4/2012 |
| WO | 2012/084960 | | 6/2012 |
| WO | 2012095506 | A1 | 7/2012 |
| WO | 2012102677 | A1 | 8/2012 |
| WO | 2012/135065 | | 10/2012 |
| WO | 2013/022945 | A2 | 2/2013 |
| WO | 2013/059314 | | 4/2013 |
| WO | 2014/071238 | A1 | 5/2014 |
| WO | 2014100766 | A2 | 6/2014 |
| WO | 2014144704 | A1 | 9/2014 |
| WO | 2014144778 | A1 | 9/2014 |
| WO | 2016210337 | A2 | 12/2016 |

OTHER PUBLICATIONS

Preliminary office action recevied for IL Appl. No. 239528 dated Feb. 4, 2017.
Second office action received for CA Appl. No. 2,896,047 dated May 1, 2017.
Second Office Action for IL Application No. 239528, dated Apr. 25, 2018.
Third Office Action; CA Application No. 2,896,047, dated Aug. 9, 2018.
International Search Report and Written Opinion for Appl No. PCT/US2013/077314, dated Apr. 28, 2014.
European Search Report received for PCT/US2013077314 dated Jul. 27, 2016.
First Office Action Issued by State Intellectual Property Office for PCT Application No. 201380071624.6 dated May 5, 2016.
First Office Action received for Canadian Application No. 2896047 dated Jul. 7, 2016.
Akthakul, et al., "Antifouling polymer membranes with subnanometer size selectivity", Macromolecules 37, Sep. 3, 2004, 7663-7668.
Cath, et al., "Forward osmosis: principles, applications and recent developments", Journal of Membrane Science 281, May 31, 2006, 70-87.
Li, et al., "Electronic properties of multiwalled carbon nanotubes in an embedded vertical array", Applied Physics Letters vol. 81, No. 5, 2002, 910-912, Jul. 2002.
Mandal, et al., "Drug delivery system based on chronobiology—a review", Journal of Controlled Release 147, Aug. 4, 2010, 314-325.
Mccutcheon, et al., "Influence of membrane support layer hydrophobicity on water flux in osmotically driven membrane processes", Journal of Membrane Science, Mar. 2008, 458-466.
Mceuen, P. et al., "Single-Walled Nanotubes Electronics", IEEE Transactions on Nanotechnology, Vo. 1, No. 1, Mar. 2002.
Santus, et al., "Osmotic drug delivery: a review of the patent literature", Journal of Controlled Release 35, Jul. 1995, 1-21.
Sotthivirat, et al., "Controlled porosity-osmotic pump pellets of a poorly water-soluble drug using sulfobutylether-b-cyclodestrin, (SBE)_7M-b-CD, as a solubilizing and osmotic agent", Journal of Pharmaceutical Sciences vol. 96, No. 9, Sep. 2007, 2364-2374.
Yip, Nagai Y. et al., "High Performance Thin-Film Composite Forward Osmosis Membrane", Environmental Science & Technology, vol. 44, No. 10, 2010, Apr. 21, 2010, 3812-3818.
Zhao, et al., "Modification of porous poly (vinylidene fluoride) membrane using amphiphilic polymers with different structures in phase inversion process", Journal of Membrane Science 310, Mar. 2008, 567-576.
U.S. Appl. No. 15/739,657, Methods of Dewatering of Alcoholic Solutions Via Forward Osmosis and Related Systems, filed Dec. 22, 2017.
Office Action dated Sep. 20, 2018 for EP Application No. 13865011.4.
Chen, et al., "Influences of molecular weight, molecular size, flux, and recovery for aromatic pesticide removal by nanofiltration membranes", Jan. 2004, Desalination 160, pp. 103-111.
Fourth Office Action received for Canadian Application No. 2,896,047, dated Jul. 9, 2019, 4 pages.
English Translation of Israeli Office action for IL Application No. 264433, dated Aug. 22, 2019, 4 pages.

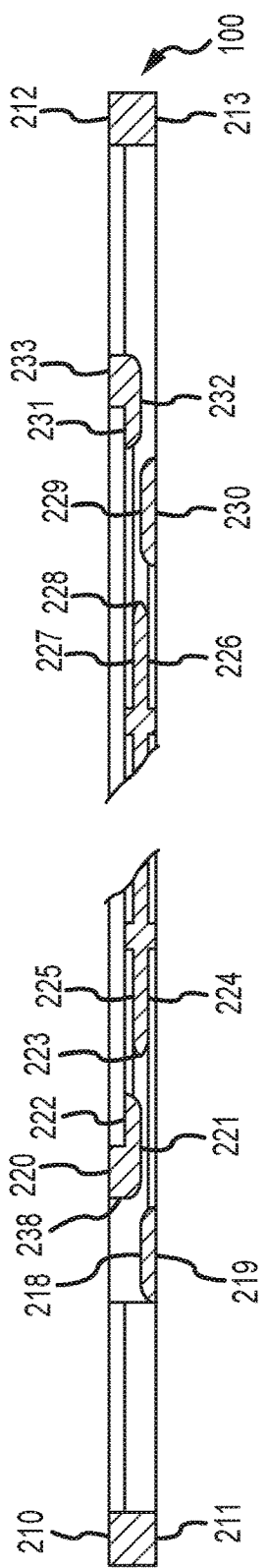
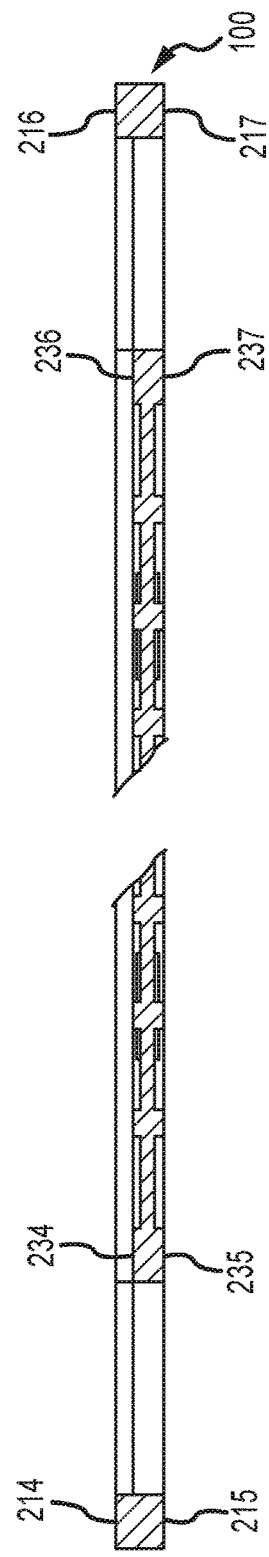
FIGURE 3A
FIGURE 3B

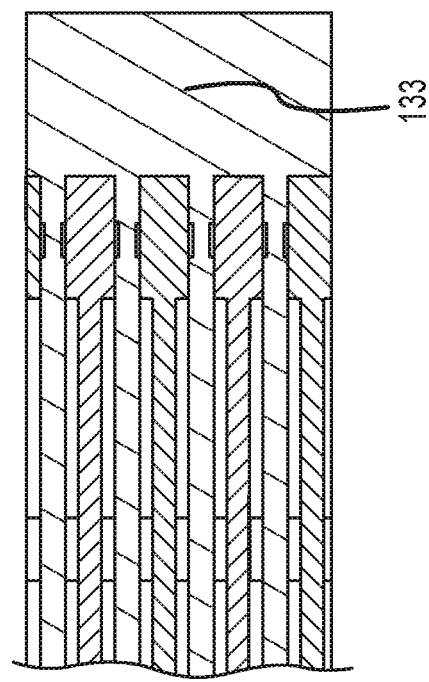
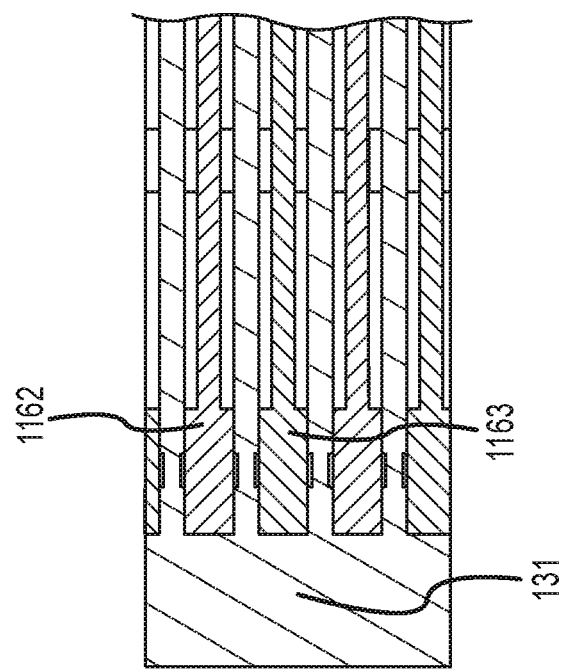
FIGURE 9

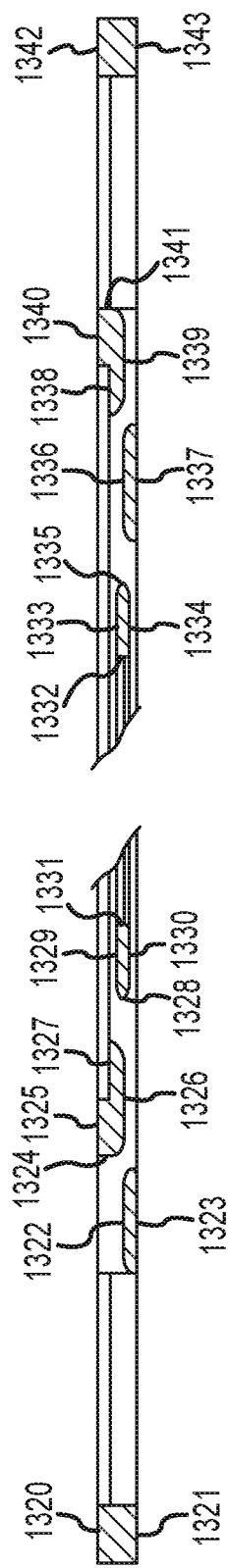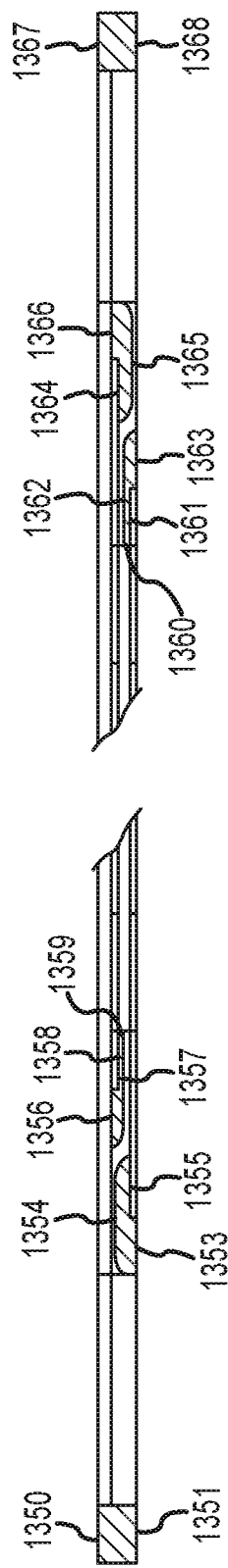
FIGURE 11A
FIGURE 11B

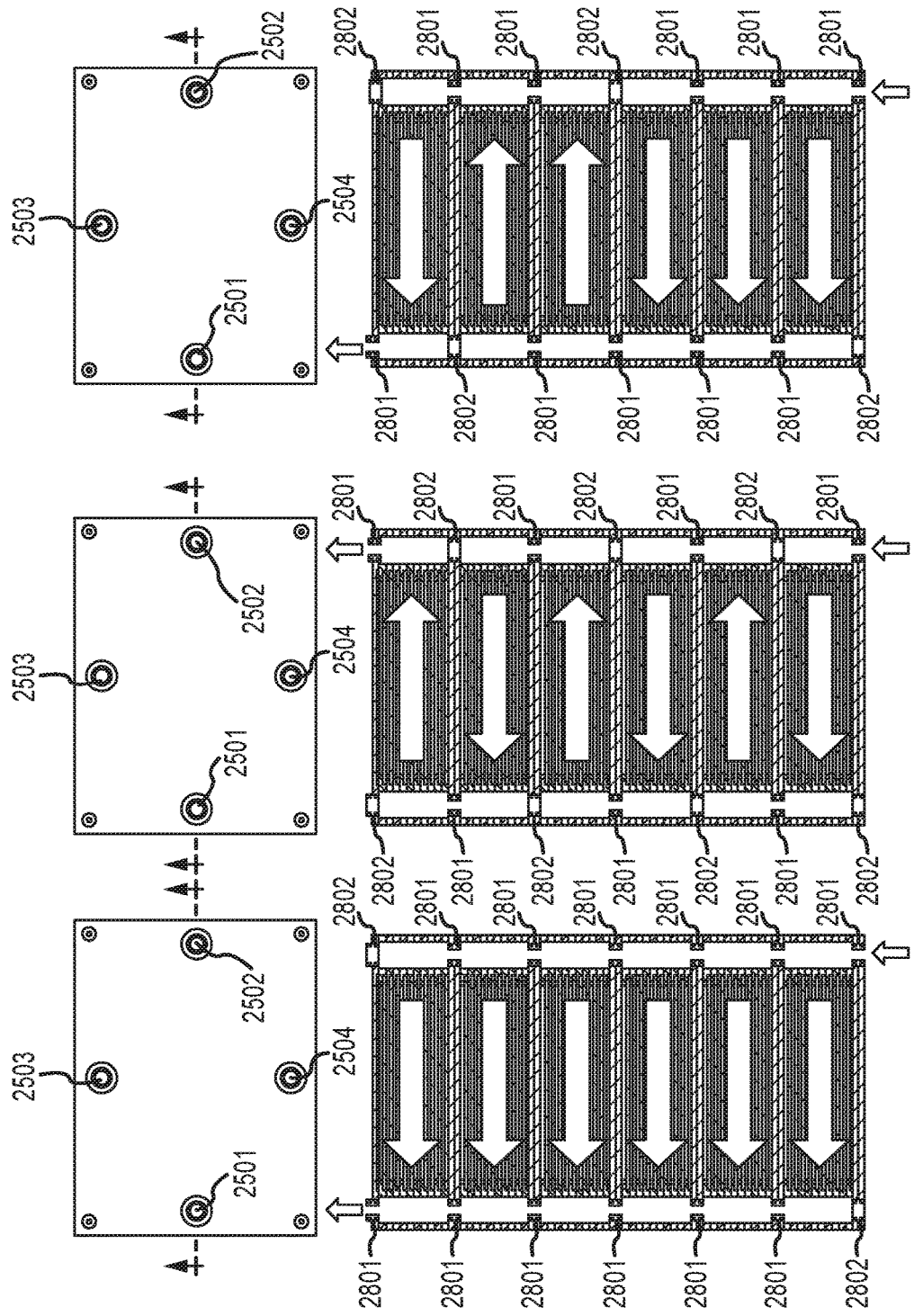

SEPARATION SYSTEMS, ELEMENTS, AND METHODS FOR SEPARATION UTILIZING STACKED MEMBRANES AND SPACERS

CROSS-REFERENCE

This application is a divisional of U.S. patent application Ser. No. 14/137,903, filed Dec. 20, 2013, which claims the filing benefit of U.S. provisional application No. 61/745,300, filed Dec. 21, 2012. These applications are incorporated by reference herein in their entirety and for all purposes.

GOVERNMENT SPONSORSHIP

This invention was made with Government support under contract number W911NF-09-C-0079 awarded by the Department of Defense. The Government has certain rights in this invention.

TECHNICAL FIELD

Examples described herein relate to separation systems, elements, and methods which may be used for forward osmosis (FO), pressure retarded osmosis (PRO), or generally any separation process.

BACKGROUND

Membranes may be used to perform osmosis, which generally occurs when two solutions of differing concentration are placed on opposite sides of a permeable or semipermeable membrane. The osmotic pressure difference between the two solutions drives the permeation of water across the membrane from the dilute solution to the concentrated solution, while the selective property of the membrane retains the solutes in their respective solution.

Plate and frame separation elements may generally include a plate and frame for enclosing a stack or array of membrane plate assemblies. Plate and frame separation elements may include a combination of a flat sheet membrane, a draw channel spacer, a flat sheet membrane, and feed channel spacer.

SUMMARY

Examples of separation systems, membrane plate assemblies, spacer plates, and methods are described herein. An example separation system may include a plurality of membrane plate assemblies. Each of the membrane plate assemblies may include a spacer plate having a spacing region. The spacer plate may at least partially define a first opening and a second opening. The spacer plate may include a first surface having a first bonding area and an opposing second surface having a second bonding area. The membrane plate assemblies may each include a first membrane bonded to the first surface at the first bonding area. The membrane plate assemblies may each includes second membrane bonded to the second surface at the second bonding area The membrane plate assemblies may form a stack, with adjacent membrane plate assemblies in the stack having alternating orientations. The first surface and the second surface may have a staggered position with respect to one another. The first opening of the spacer plate may be in fluid communication with a region between the first and second membranes defining a first flow path. The separation system may further include support plates coupled to hold the membrane elements in a stack, wherein at least one of the support plates defines at least one fluid port.

In some examples, the spacing region may include a sheet comprising protrusions, cavities, textures, or combinations thereof on both sides, wherein the protrusions, cavities, textures, or combinations thereof are in contact with the first membrane and the second membrane, defining a flow path across the spacing region.

In some examples, the spacing region comprises an inner membrane assembly, wherein the inner membrane assembly comprises a third membrane on a first side of the spacer plate, a fourth membrane on a second side of the spacer plate.

In some examples, the separation system may further include a spacer sheet between at least two adjacent membrane surfaces.

In some examples, the separation system may further include a spacer sheet bonded to the first surface at the first bonding area and positioned on a side of the first membrane opposite the spacer plate, wherein the side of the spacer sheet opposite to the first membrane of the first membrane plate assembly is in contact with the side of the second membrane of a second membrane plate assembly opposite to the spacer plate of the second membrane plate assembly.

In some examples, the second opening is in fluid communication with a region between adjacent membrane plate assemblies in the stack defining a second flow path.

In some examples, the second opening is in fluid communication with a region between adjacent membrane plate assemblies in the stack and the third and fourth membranes defining a second flow path, and wherein the first opening is in fluid communication with regions between the first and third membranes and the second and fourth membranes.

In some examples, the first flow path is configured to facilitate flow of a fluid in a first direction in the regions between the first and third membranes and the second and fourth membranes and the second flow path is configured to facilitate flow of a fluid in a second direction in the region between the third and fourth membranes and between adjacent membrane plate assemblies in the stack defining a second flow path wherein the first and second directions are orthogonal.

In some examples, the at least one fluid port is in communication with the first opening of at least one membrane plate assembly and another fluid port is in communication with the second opening of at least one membrane plate assembly.

In some examples, the first and second openings are located on different edges of the spacer plate.

In some examples, the first flow path is configured to facilitate flow of a fluid in a first direction in the region between the first and second membranes and the second flow path is configured to facilitate flow of a fluid in a second direction in the regions between adjacent plate assemblies, wherein the first and second directions are orthogonal.

In some examples, the first opening of each spacer plate is configured to define any of a parallel, a series, or a series of parallel flow paths for the first fluid.

In some examples, the second opening of each spacer plate is configured to define any of a parallel, a series, or a series of parallel flow paths for the second fluid.

In some examples, the first opening of each spacer plate is coupled to one or more of the fluid ports of one or more support plates.

In some examples, the second opening of each spacer plate is coupled to one or more of the fluid ports of one or more support plates.

In some examples, the separation system is immersed in a first fluid, and each of the first openings are exposed to the first fluid.

In some examples, another fluid port is coupled to the second openings and is configured to provide a second fluid.

In some examples, each of the spacer plates is formed from an injection molded plastic.

In some examples, any of the first membranes or the second membranes are forward osmosis membranes.

In some examples, any of the first membranes or the second membranes comprise cellulose acetate, a thin film composite, polyimide, aramid, poly(vinylidene fluoride), or polypropylene.

In some examples, the membrane plate assemblies further comprise interconnects configured to define a parallel flow path or a series flow path.

An example method includes transporting a first fluid in a first direction in regions between certain ones of a plurality of membranes. An example method may further include transporting a second fluid in a second direction in other regions between other ones of the plurality of membranes. The first and second fluids may each comprise solutes, and the concentration of a solute may be higher in the first fluid such that the concentration of a solute in the second fluid is increased at least in part by fluid transport across the membranes. The first and second directions may be perpendicular directions.

In some examples, at least pairs of the certain ones of the plurality of membranes are bonded to respective spacer plates to form the regions and the respective spacer plates are stacked such that the bonded regions of the certain ones of the plurality of membranes are staggered in relation to one another.

In some examples, the regions between certain ones of the plurality of membranes are configured to define any of a parallel, a series, or a series of parallel flow paths of the first fluid.

In some examples, the regions between other ones of the plurality of membranes are configured to define any of a parallel, a series, or a series of parallel flow paths of the second fluid.

In some examples, at least pairs of the plurality of membranes are bonded to respective spacer plates, and the spacer plates are formed from an injection molded plastic.

In some examples, the membranes comprise cellulose acetate, a thin film composite, polyamide, aramid, poly(vinylidene fluoride), polypropylene, or combinations thereof.

In some examples, methods further include introducing air bubbles into any of the regions.

In some examples, methods further include transporting the first fluid or the second fluid in a parallel flow path to each of the regions between the certain ones of the plurality of membranes and transporting the other of the first fluid or the second fluid in a series flow path to each of the regions between the other ones of the plurality of membranes.

BRIEF DESCRIPTION OF THE DRAWINGS

FIG. 3A is a cross-sectional view of a spacer plate of a separation system along a first axis, according to some embodiments.

FIG. 3B is a cross-sectional view of a spacer plate of a separation system along a second axis, according to some embodiments.

FIG. 9 is a broken cross-sectional view of a separation system along a second axis, according to some embodiments.

FIG. 11A is a cross-sectional view of a spacer plate of a separation system along a first axis, according to some embodiments.

FIG. 11B is a cross-sectional view of a spacer plate of a separation system along a second axis, according to some embodiments.

FIG. 21A is cross-sectional view of a separation system stacked in parallel, according to some embodiments.

FIG. 21B is a cross-sectional view of a separation system stacked in series, according to some embodiments.

FIG. 21C is a cross-sectional view of a separation system stacked in a combination of series and parallel, according to some embodiments.

DETAILED DESCRIPTION

Certain details owe set forth below to provide a sufficient understanding of embodiments of the invention. However, it will be clear to one skilled in the art that embodiments of the invention may be practiced without various of these particular details. In some instances, well-known chemical structures, chemical components, molecules, materials, manufacturing components, control systems, electronic components, timing protocols, and software operations have not been shown in detail in order to avoid unnecessarily obscuring the described embodiments of the invention.

Disclosed herein are example embodiments of systems, apparatuses and methods for forward osmosis (FO), pressure retarded osmosis (PRO), membrane distillation (MD), heat exchange membranes, evaporator membranes, contact membranes, condenser membranes, and absorber membranes, or generally any separation process. Examples include plate and frame separation elements adapted for use in four port separation where two flow paths may be used. Plate and frame separation elements may achieve low cost, high packing-density and high yield packaging. Four port separation is generally used herein to refer to separation involving two separate flow paths such that not all permeate passing through the membrane contributes to an exiting stream. Instead, a first fluid stream may be provided along a first fluid path and a second fluid stream may be provided along a second fluid path. The term four port separation is not intended to limit the number of ports which may be found on any particular element or separation system, although in some examples four ports may in fact be used.

Figure 1:
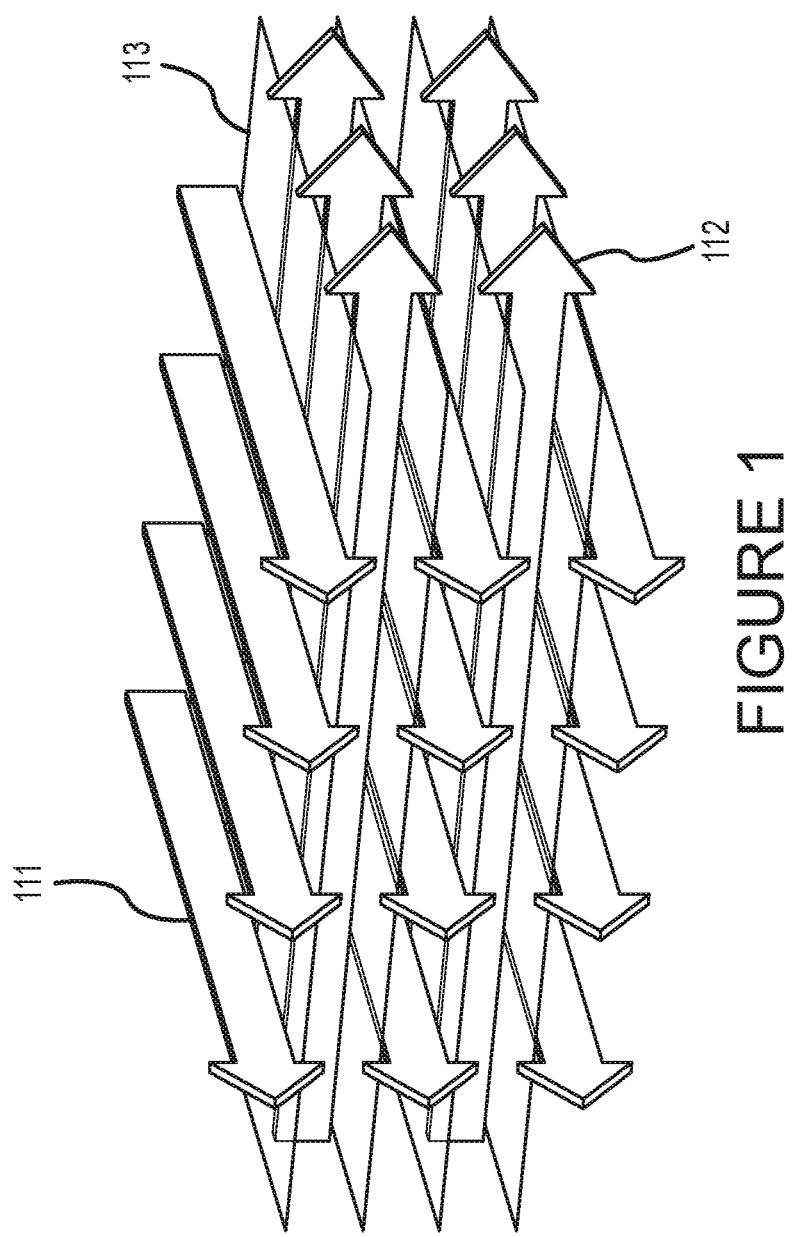
FIG. 1 is an illustration depicting perpendicular flow paths of a separation system, according to some embodiments.

FIG. 1 is an illustration depicting perpendicular flow paths of a separation system, according to some embodiments. Example membrane elements described herein may utilize stacked membrane layers. Membranes, e.g. membrane 113 may be separated from other membranes by a flow spacer. A fluid flow path may enter in one or more points on one side of the membrane stack and may exit in one or more points on a separate side of the stack. Separation may be maintained between fluid flows on opposite sides of a membrane. This may be achieved in some examples without the need for a glue-line in the middle of two membrane layers (e.g. an envelope), resulting in an improved flow path in some examples. The one or more openings may be provided along a substantial portion of the edges of the membrane plate assemblies. Thus, the one or more openings may be the same width as the flow path, thereby facilitating a uniform velocity across the membrane plate assemblies in the stack.

By providing for perpendicular flow—e.g., a draw fluid flowing in a first direction 112 parallel to the plane of one side of a membrane and a feed fluid flowing in a second direction 111, generally perpendicular to the first direction 112 on another side of the membrane—generally the entire membrane surface may be involved in fluid transfer (e.g. forward osmosis). Orthogonal flow may allow inlet and outlet manifolds to encompass the entire width of the flow path, leading to more uniformly distributed flows. This may avoid 'dead zones' associated with other fluid flow arrangements where the draw and feed fluids may not have uniform flow on either side of the entire membrane surface. Other fluid flow arrangements may also have higher head loss, resulting in lower performance of the separation system. The advantage of orthogonal flow may be provided for a ratio of the first fluid flow length to the second fluid flow length between 2:1 and 1:2 in some examples. Generally, orthogonal or perpendicular flow may refer to at least two flows oriented substantially 90 degrees with respect to one another such that an area of the membrane having different fluids on opposite sides may be maximized. Several embodiments of a flow path for a separation system may be used. In some examples, the fluid flow path and associated components flowing between two membrane layers (e.g. inside a membrane envelope) may be a draw fluid, and the fluid flow path and associated components on an opposite side of the two membrane layers (e.g. outside the membrane envelope) may be a feed fluid. It will be understood that in some examples the opposite may be the case. Fluid flow paths may be provided over rectangular or square membrane layers where the draw fluid flow path enters along one edge, flows through the region between membranes to another (e.g. opposite) edge, as will be described below. It will be understood that membranes may be in other shapes, for example 5-sided, 6-sided, 8-sided, or circular shapes. The feed flow path 111 may be separated from the draw flow path 112 and can be co-current, counter-current, orthogonal-current or anything in between. Separated flow paths generally refer herein to flow paths which do not allow for fluid flow between the two paths (e.g. fluidically isolated paths), although in some examples some amount of mixing flows may occur that is not significant to the overall separation being performed. In some examples, the flows may separate the membranes of a stack, preventing or reducing the occurrence of the membranes clinging to one another. Both feed flow paths 111 and draw flow paths 112 within the separation system may be configured independently of one another in parallel, series or a combination of parallel and series. At the membrane surface, the draw and feed flow paths may be in cross flow, with velocities with respect to the membrane surface orthogonal to one another.

Figure 2:
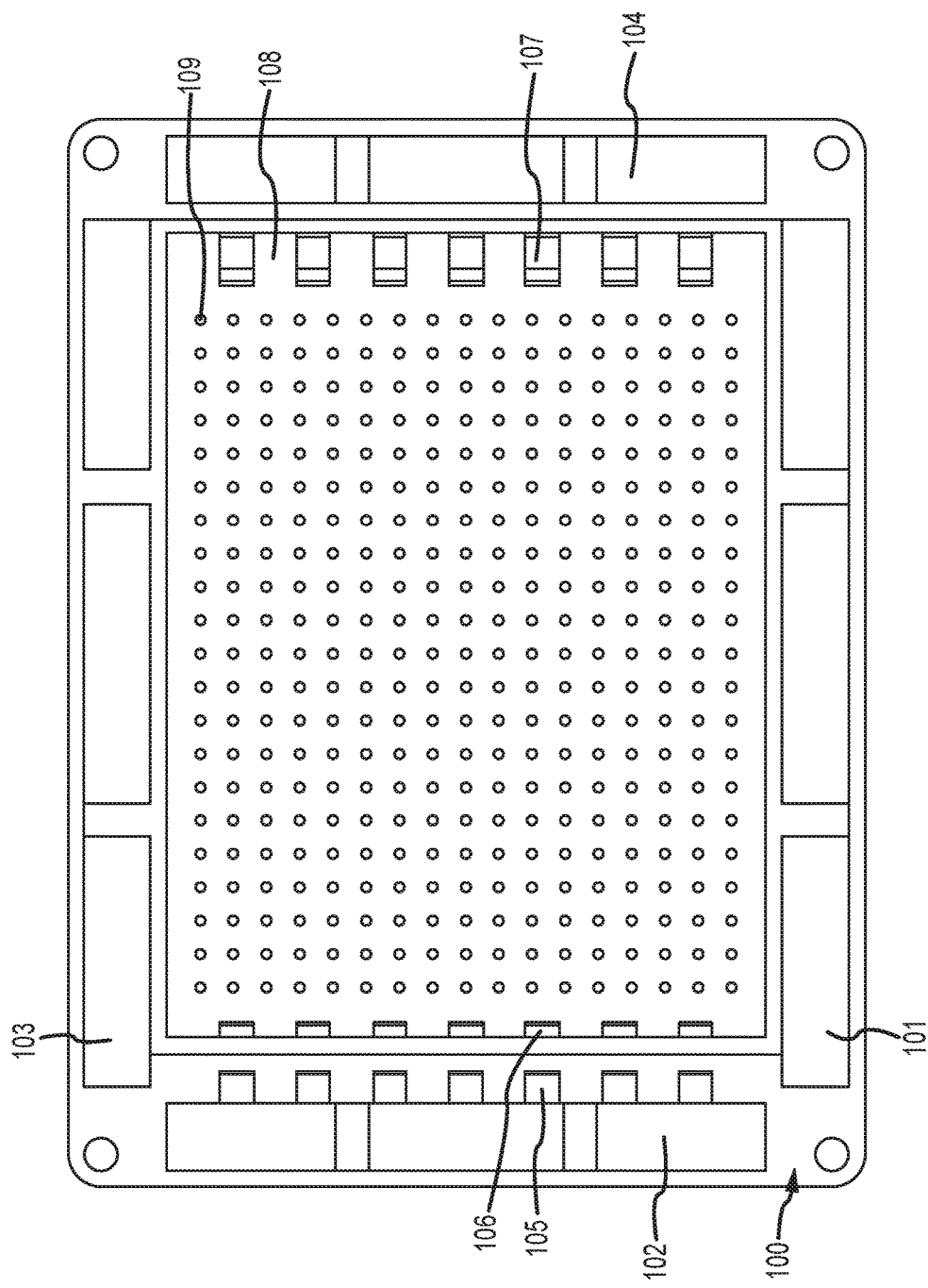
FIG. 2 is a top down view of a spacer plate of a separation system, according to some embodiments.

FIG. 2 is a top down view of a spacer plate 100 of a separation system, according to some embodiments. The spacer plate 100 may include a spacing region. In some examples, the spacing region may include by a separating sheet 108. In some examples, the spacing region may include an inner membrane assembly, as will be described below. The separating sheet 108 may be formed from an injection molded plastic, a woven material, or any sufficiently flat material that maintains the flow path inside the region between two membranes (e.g. inside an envelope). The separating sheet 108 may include features 109 on one or both sides. The features 109 may include protrusions, cavities, textures, or combinations thereof. The features 109 may be in contact with an upper membrane and/or a lower membrane in a flow path across the spacing region, as will be described below. The features 109 may create turbulence in the flow path across the spacing region Although the spacer plate 100 depicted is square, it will be understood that other geometries may be used in other examples, including geometries having three, four, five, six, or more sides or being round.

The spacer plate 100 may include one or more openings to facilitate fluid flow through or across the separation system. The one or more openings may assist in defining flow paths within the separation system. The fluid flow paths may be in parallel, series or a combination of parallel and series between adjacent membrane assemblies in a stacked system. With fluid flow paths in parallel, each membrane plate assembly may share a common opening and the fluid flow may be divided among the membrane plate assemblies. This may achieve a shortest possible flow path and lowest head losses. With fluid flow paths in series (e.g. serpentine), each membrane plate assembly may encompass the entire fluid flow rate. This may generally achieve the highest possible fluid velocity. Two separate fluid flow paths may be provided in this manner to facilitate the flow of two different fluids, for example a draw fluid and a feed fluid. In some examples, the two separate fluid flow paths may be provided with different combinations of series and parallel fluid flow paths. In some examples, the two separate fluid flow paths may be orthogonal to one another.

In some examples, the one or more openings may include an inlet opening and an outlet opening for a first fluid, for example a draw fluid. More than one inlet or outlet opening may be provided for the first fluid. In some examples, the inlet opening and the outlet opening may be on the opposite edges of the spacer plate 100 so as to facilitate flow of the first fluid in a first direction across the spacer plate. The inlet opening and the outlet opening may be in fluid communication with regions between the membrane plate assemblies of the separation system. In some examples, the spacer plate 100 may be in a first orientation, and the inlet opening may be opening 102 and the outlet opening may be opening 104. In some examples, the spacer plate may be in a second orientation, and the inlet opening may be opening 104 and the outlet opening may be opening 102. In some examples, the second orientation may be a 180° rotation about a third axis through the thickness of the spacer plate 100 (e.g., in plane) from the first orientation. In some examples, elements described herein may include a stack of membrane plate assemblies, with adjacent membrane plate assemblies in the stack having alternating orientations. In some examples the membranes bonded to the spacer plate 100 may have a staggered position with respect to one another. For example, the locations at which membranes are bonded to opposite sides of the spacer plate may not be the same (e.g. not on directly opposite locations on the spacer plate). In some examples, the location at which the membrane is bonded to the spacer plate is off-center such that when adjacent spacer plates are placed in different orientations in a stack (e.g. rotated 180 degrees with respect to one another), adjacent membranes in the stack may be staggered relative to one another. In this manner, flow paths may be defined by a combination of adjacent membrane plate assemblies, while allowing the spacer plates to be formed without the need for trapped features (e.g. the spacer plates may be injection molded). Although some examples described herein may refer to certain features, such as opening 102, as an inlet opening and may refer to other features, such as opening 104, as an outlet opening, it is to be understood that the openings on spacer plates and other flow paths described herein, such as opening 102 and opening 104, may be either an inlet or an outlet depending on the orientation of the spacer plate or configuration of the flow path.

In some examples, the inlet opening, for example opening 102, may be in fluid communication with the regions between the membrane plate assemblies by a first conduit, for example conduit 105, that transports the first fluid to a second conduit, for example conduit 106, that leads into the flow path across the spacing region 108. So, for example, the opening 102 may form a fluid manifold when in a stack with multiple spacer places. The opening 102 may be in fluid communication with openings 105 and 106 which may allow fluid from the manifold region to pass under a portion of the spacer plate and enter, at opening 106, a region between the spacer plate and membranes bonded to the spacer plate. After traveling across the spacing region, the first fluid may exit the spacer plate 100 through a third conduit, for example conduit 107, that may be in fluid communication with the outlet opening, for example 104. In some examples, the inlet opening and/or the outlet opening may be in fluid communication with one or more fluid ports, as will be described below. Similarly, the one or more openings may include an inlet opening, for example opening 101, and an outlet opening, for example opening 103, for a second fluid, for example a draw fluid. The inlet opening and outlet opening for the second fluid may be on different edges with respect to the inlet opening and outlet opening for the first fluid, and opposite with respect to one another. The openings 101 and 103 may form another conduit when stacked with other spacer plates, and may be in fluidic communication with regions between the adjacent membrane plate assemblies in the stack. For example, fluid entering the opening 101 (or 103) may be able to pass between an upper membrane of the spacer plate 100 and a lower membrane of a spacer plate stacked above the spacer plate 100. Fluid entering the opening 101 (or 103) may traverse the region between spacer plates in the direction from 101 to 103 (or vice versa). This arrangement may facilitate a flow path for the second fluid that is orthogonal to the flow path for the first fluid.

Accordingly, examples of spacer plates described herein, including the spacer plate 100 of FIG. 2 may include a first opening which is in fluid communication with a region between membranes bonded to the spacer plate. Example spacer plates may further include a second opening which may be in fluid communication with a region between adjacent plate assemblies when the plate assemblies are stacked.

In some examples, the one or more fluid ports may be fitted with interconnects to define a fluid connection between an upper and lower membrane element. In some examples, the interconnects may include nipples 2800 that may direct a fluid in a desired manner. As shown in FIG. 22, a nipple 2800 may be shaped to fit within a fluid port of the membrane element. The nipples 2800 may be coupled to the membrane elements using one or more sealing elements 2803, for example O-rings. In some examples, there may be one or more sealing elements 2803 coupled to both an upper membrane element and a lower membrane element. A closed interconnect, for example closed nipple 2802 shown in FIGS. 22B and 22C, may block the opening separating a first membrane element from a second membrane element such that fluid cannot pass through from the first membrane element to the second membrane element. An open interconnect 2801, for example open nipple 2801 shown in FIGS. 22A, 22b, and 22C, may include a channel that allows for fluid communication through the opening separating a first membrane element from a second membrane element such that fluid may pass through from the first membrane element to the second membrane element. By connecting two or more elements in parallel, these interconnects may be used to configure the elements in parallel (FIG. 21A), series (FIG. 21B) or a combination of series and parallel (FIG. 21C). The first flow path and the second flow path may be configured independently. In some examples the first flow path may be configured in parallel while the second flow path is configured in series. In this manner, a series flow, a parallel flow, or combinations thereof may be established between a stack of membrane elements.

During osmotic flow, membrane flux may be significantly reduced by concentration polarization (CP). Examples of separation systems disclosed herein may increase membrane flux by reducing concentration polarization. Membrane flux is generally proportional to the effective osmotic driving force. The osmotic driving force may be dissipated by CP, for example internal CP or external CP. Internal CP may be a function of a support layer of the membrane and the diffusion of the draw solute. The internal CP generally remains relatively constant with respect to the spacer plate geometry. External CP may exist within a boundary layer outside of the membrane thickness. External CP may be mitigated through adequate mixing in some examples.

Reduced CP may be achieved by using a spacer plate formed of injection molded plastic parts or stamped out of another material. This may allow for flexibility in spacer plate geometry as many shapes and surface textures can be molded with no or minimal increase to part cost. In this manner, the fabrication of an optimized spacer plate surface may be achieved with no or limited increase to part cost. An optimized spacer plate may advantageously mitigate external CP by increasing draw fluid turnover while maintaining a low head loss. This may reduce the amount of dilutive external CP, thereby increasing the effective osmotic driving force.

FIG. 3A is a cross-sectional view of a spacer plate 100 of a separation system along a first axis, according to some embodiments. FIG. 3B is a cross-sectional view of a spacer plate of a separation system along a second axis, according to some embodiments. The spacer plate 100 may include a first surface having one or more bonding areas. The bonding areas may be generally along the perimeter of the spacer plate 100. In some examples, the bonding areas may be where an element of the separation system, for example a membrane or another spacer plate 100, may be coupled to the spacer plate 100. The element of the separation system may be coupled to the spacer plate 100 using an adhesive (e.g. pressure sensitive adhesive), by welding (e.g., thermal, solvent, or ultrasonic weld), a glued line, a fold in material, and/or any other known mechanism. The coupling may provide a fluidic seal. In some examples, a first bonding area of the first surface of the spacer plate 100 may include surfaces 210, 212, 214 and 216. In some examples, a second bonding area of the first surface of the spacer plate 100 may include surfaces 220 and 233, and may be staggered (e.g., asymmetrically arranged) about the second axis. The first and second bonding areas may be used to couple a first spacer plate 100 and a second spacer plate 100. The spacer plate 100 may also include bonding areas for coupling the spacer plate 100 with a membrane 302. These bonding areas may include surfaces 222 and 231, which may be staggered about the second axis, and surfaces 234 and 236, which may be symmetrical about the first axis.

The spacer plate 100 may include a second surface having similar bonding areas as the bonding areas on the first surface. The second surface may be located on an opposite side of the spacer plate 100 relative to the first surface. The second surface of a first spacer plate 100 may bond to the first surface of a second spacer plate 100, as will be described below. In some examples, a first bonding area of the second surface of the spacer plate 100 may include surfaces 211, 213, 215 and 217. In sonie examples, a second bonding area of the second surface of the spacer plate 100 may include surfaces 219 and 230. The spacer plate 100 may also include bonding areas for coupling the spacer plate 100 with a membrane 303. These bonding areas may include surfaces 219 and 230, which may be staggered about the second axis, and surfaces 235 and 237, which may be symmetrical about the first axis.

Figure 4:
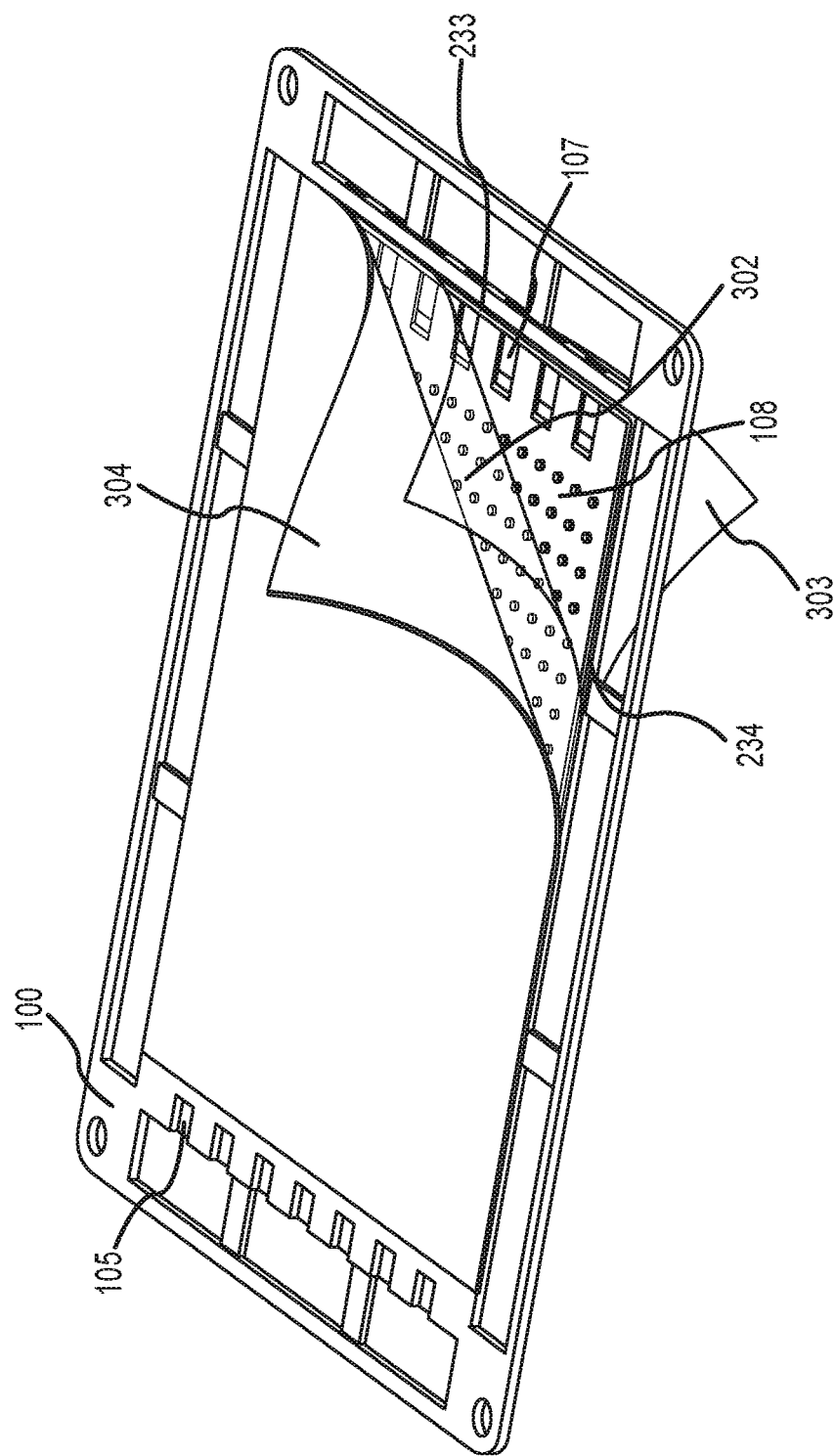
FIG. 4 is an isometric view of a membrane plate assembly of a separation system, according to some embodiments.

FIG. 4 is an isometric view of a membrane plate assembly of a separation system, according to some embodiments. A membrane plate assembly may include a spacer plate 100, a first membrane 302 (also referred to herein an "upper membrane"), a second membrane 303 (also referred to herein as a "lower membrane"), and a spacer sheet 304. The first membrane 302 may be bonded to a first surface of the spacer plate 100 along the perimeter of the first membrane 302. The second membrane 303 may be bonded to a second surface of the spacer plate 100 along the perimeter of the second membrane 303. In some examples the first membrane may form a membrane to plate bond on surfaces 222, 231, 234, and 236 around the entire perimeter of the membrane. The second membrane 303 may form a membrane to plate bond on surfaces 219, 230, 235 and 237 around the entire perimeter of the membrane. In some examples, the support side (backside) of the membranes may be bonded to the spacer plate 100. In this manner, the membrane plate assembly may operate in a skin to feed mode (e.g., FO mode). In some examples, the skin side (frontside) of the membranes may be bonded to the spacer plate 100. In this manner, the membrane plate assembly may operate in a skin to salt mode (e.g., PRO mode).

The first membrane 302 and the second membrane 303 may be formed from a variety of membrane materials including, but not limited to, cellulose acetate, polyacrylonitrile, meta-aramides e.g., Nomex®) and/or para-aramids (e.g., Kevlart®), acrylate-modified poly(vinylidene fluoride), polyamide or thin film composite (TFC) with a polysulfone, polyamide, polyethersulfone, polyacrylonitrile, meta-aramides (e.g., Nomex®) and/or para-aramids (e.g., Kevlar®), acrylate-modified poly(vinylidene fluoride) polymer support layer, or any membrane suitable for forward osmosis. Different types of membranes may be used, for example reverse osmosis membranes, ultrafiltration membrane, membrane distillation membranes, or pressure retarded osmosis membranes.

The spacer sheet 304 may be formed from a material that supports a structured flow path between the two layers of membrane outside the envelope. The spacer sheet 304 may be implemented using a woven material, a molded plastic material, or any sufficiently flat material that maintains the flow path outside the envelope. The spacer sheet 304 may be positioned on a side of a membrane opposite the spacer plate 100. The spacer sheet 304 may be coupled to the spacer plate 100 along its perimeter to a bonding area of the spacer plate 100 or a membrane. The coupling may be achieved using methods including, but not limited to, gluing, welding, mechanically fastening, or using an adhesive. In some examples, the spacer sheet 304 may be coupled to a first spacer plate 100 on surfaces 219 and 230 and a second spacer plate 100 on surfaces 222 and 231. The spacer sheet 304 is optional and may not be included in all examples. When the spacer sheet 304 is absent, a void may be present in the region, allowing fluid flow.

Referring to FIG. 4, in some examples, a first fluid may enter fluid manifolds on the right or left-hand side of the Figure, and access the region between membranes 302 and 303 through, for example, the openings 105 and 107. A second fluid may enter fluid manifolds shown on the upper or lower side of the Figure, and access regions between adjacent membrane plate assemblies (e.g. outside of the membranes 302 and 303). The membranes 302 and 303 may be bonded to the plate across the width of the spacer plate shown in FIG. 4, such that fluid from the manifolds shown on the upper and lower edges of the spacer plate may be isolated from the region between the membranes 302 and 303.

Figure 5:
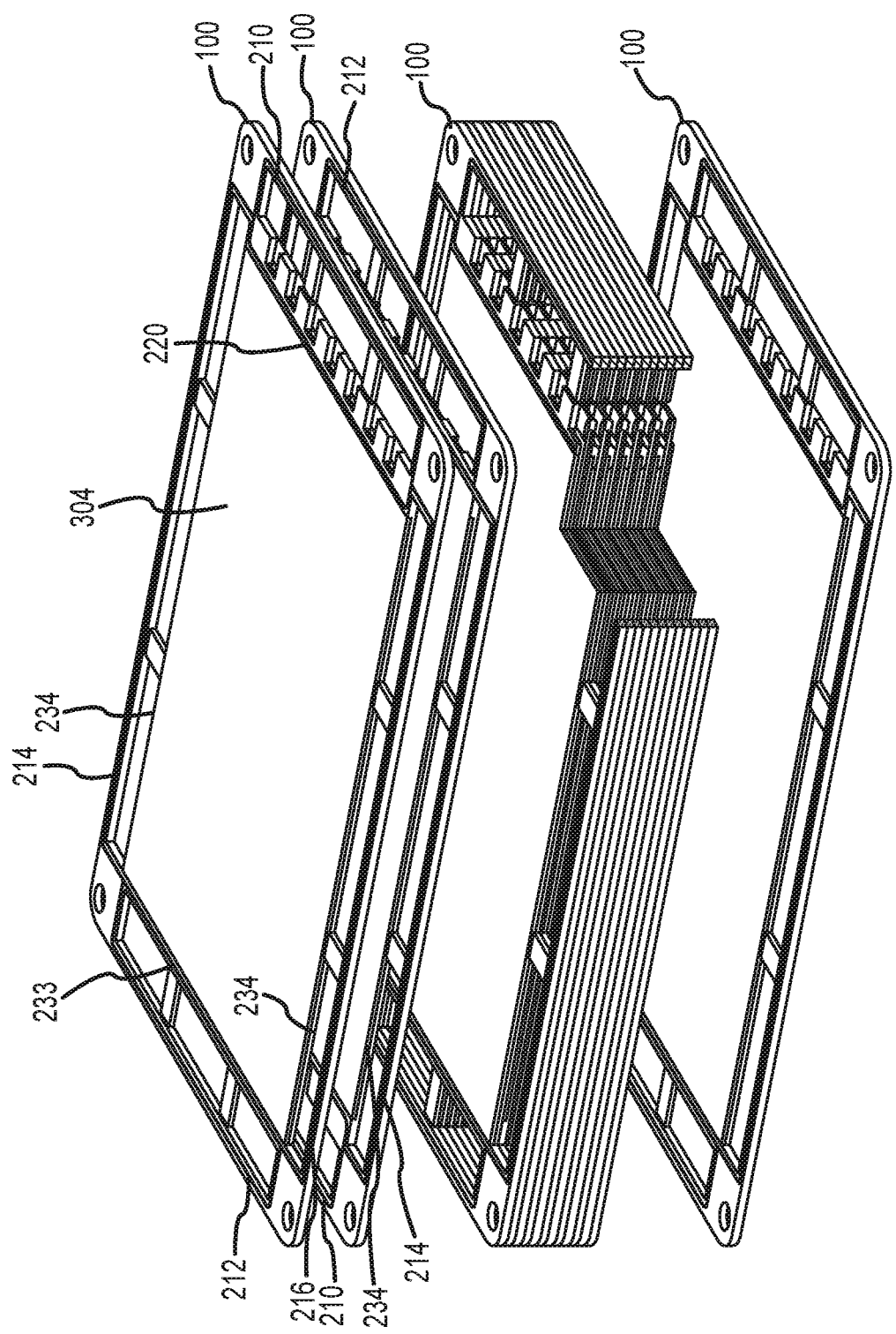
FIG. 5 is an isometric view of multiple membrane plate assemblies arranged in a stack, according to some embodiments.

FIG. 5 is an isometric view of multiple membrane plate assemblies arranged in a stack, according to some embodiments. Once stacked, the one or more openings of the spacer plates 100 may be arranged such that the inlets and outlets 101, 102, 103, and 104 may align with one another to form a unified manifold. In some examples, the one or more openings aligned with one another may allow a fluid to be in fluid communication with multiple conduits of the spacer plates 100 of each of the membrane plate assemblies in the stack. In this manner, parallel flow may be achieved. In some examples, the openings of one of the spacer plates 100 may be blocked to force all of the fluid to pass through the conduits of that spacer plate 100. In this manner, series flow may be achieved.

The spacer plates 100 may be stacked by coupling the plates together at their bonding areas, as described above. Perimeter plate to plate coupling may be achieved by joining surface 210 of a lower plate 1051 (See FIG. 8) to surface 213 of an upper plate 1050 and joining surface 212 of the lower plate 1051 to surface 211 of the upper plate 1050 and joining surface 214 of the lower plate 1051 to surface 217 of the upper plate 1050 and joining surface 216 of the lower plate 1051 to surface 215 of the upper plate 1050. Joining the surfaces of the spacer plates 100 in this manner may result in an alternating arrangement of the spacer plates 100 in which each spacer plate 100 is rotated 180° in plane with respect to the spacer plate 100 adjacent to it. Note that the asymmetric design of the spacer plate 100 facilitates formation of flow paths using a single type of plate and without the need to have trapped features on the spacer plate 100 (e.g. the spacer plate 100 may be an injection molded part). Perimeter plate to plate coupling may separate the fluid flow paths from the outside world. In addition, internal plate to plate coupling may be achieved by joining surface 233 of the lower plate 1051 to surface 219 of the upper plate 1050 and surface 220 of the lower plate 1051 to surface 230 of the upper plate 1050. Internal plate to plate coupling may separate the first fluid flow path and the second fluid flow path. Both the perimeter plate to plate coupling and the internal plate to plate coupling may include joining the plates along the entire width of the spacer plate 100.

Figure 6:
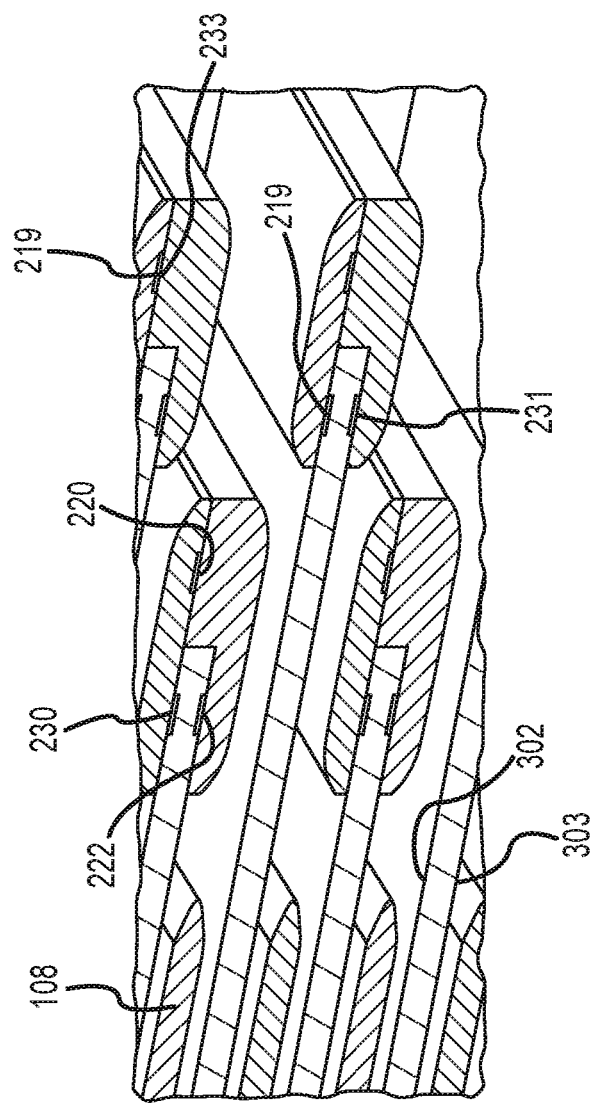
FIG. 6 is an isometric view of the multiple membrane plate assemblies of FIG. 5 showing bonding between each membrane plate assembly, according to some embodiments.

FIG. 6 is an isometric view of the multiple membrane plate assemblies of FIG. 5 showing bonding between each membrane plate assembly, according to some embodiments. The membrane plate assemblies in the stack may be in alternating orientations with respect to one another to allow the plate to be injection molded. A staggered second bonding area (internal seal separating draw from feed) may be achieved by an asymmetric arrangement of surfaces, as shown in FIGS. 3A and 3B. The asymmetric arrangement of surfaces of the spacer plate 100 may provide inner plate-to-plate bonding areas on both sides of the spacer plate 100 that are the same distance apart, but positioned at different points along the spacer plate 100. In some examples, the spacer plates 100 may alternate in orientation to achieve the staggered membrane arrangement. For example, the distance between surface 220 and surface 233 may be the same as the distance as the distance between surface 219 and surface 230. This may allow for surface 220 of a first plate to join with surface 230 of a second plate while surface 233 of the first plate joins with surface 219 of the second plate. As shown in FIG. 3A, surface 220 may not be aligned with surface 219 and surface 233 may not be aligned with surface 230. This offset may create a staggered arrangement. Continuing with the previous example, surface 219 of the first plate may join with surface 233 of a third plate and surface 230 of the first plate may join with surface 220 of the third plate. The second plate and third plate may be in alignment because the first plate may have been rotated 180° with respect to the second plate and the third plate may have rotated 180° about the third axis with respect to the first plate. By using an asymmetric arrangement of surfaces and alternating the membrane plate assemblies, it may be feasible to injection mold the spacer plates 100 out of one piece while maintaining a desired number of openings, for example four openings, and desired number of distinct flow paths, for example two distinct flow paths. In this manner, trapped features may be avoided, and only one type of plate may be required throughout the membrane element, and only one type of plate may be required throughout the membrane element, thereby enhancing manufacturing efficiency and packing density.

Figure 7:
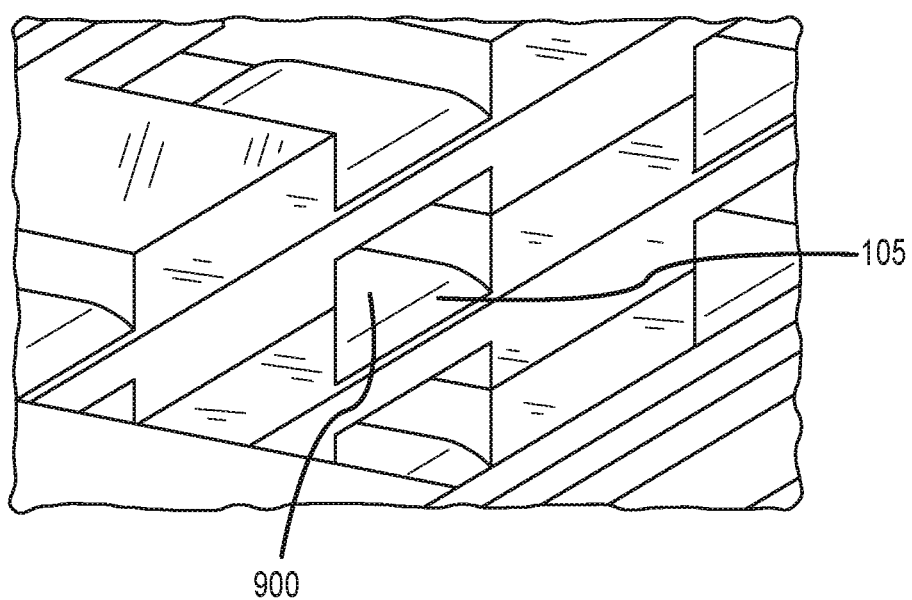
FIG. 7 is an isometric view of the multiple membrane plate assembly of FIG. 5 showing a channel provided by stacking the membrane plate assembly, according to some embodiments.

FIG. 7 is an isometric view of the multiple membrane plate assemblies of FIG. 5 showing a channel 900 provided by stacking the membrane plate assemblies, according to some embodiments. Channels 900 may be associated with a first fluid or a second fluid. Once stacked, an array of channels 900 for a first fluid may be on two sides of the stack and an array of channels 900 for a second fluid may be on another two sides of the stack. In some examples, the two sides that the array of channels 900 for each fluid is located are opposite to one another.

Figure 8:
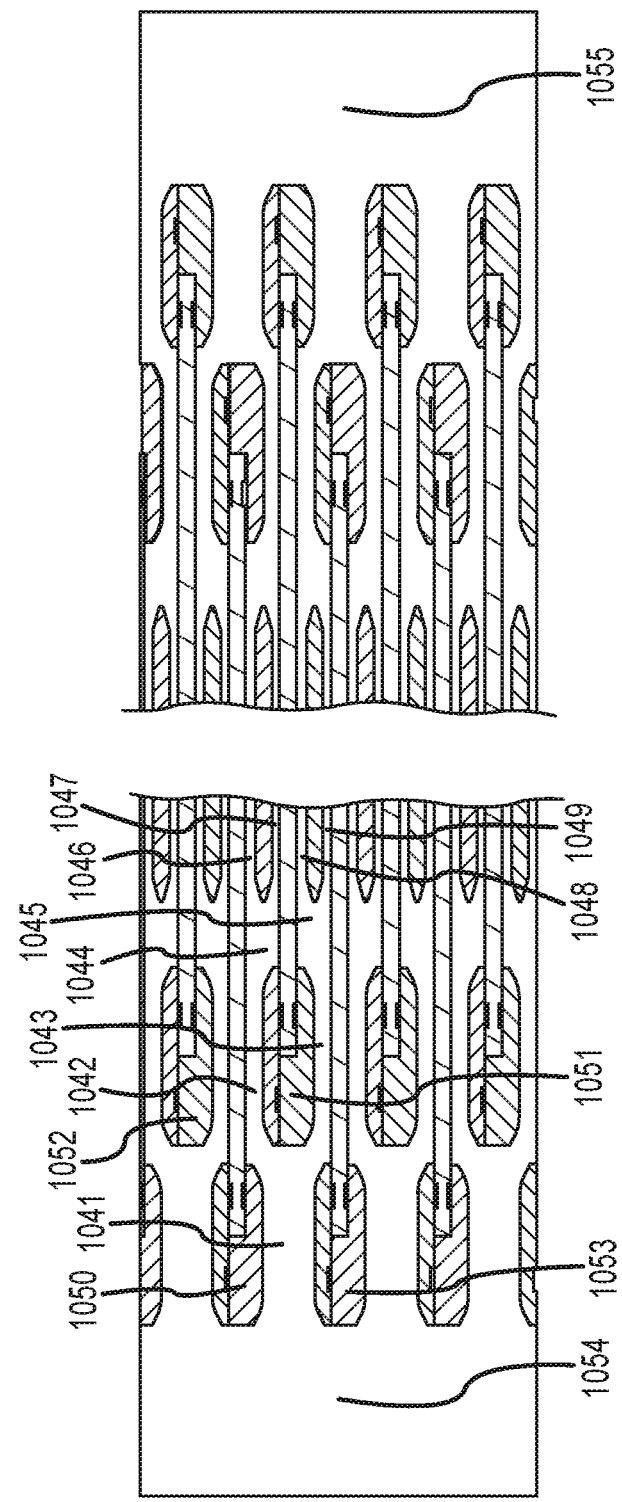
FIG. 8 is a broken cross-sectional view of a separation system along a first axis, according to some embodiments.

FIG. 8 is a broken cross-sectional view of a separation system along a first axis, according to some embodiments. In some examples, a first fluid may enter from the inlet opening, for example the first inlet manifold 1054 formed by openings 102 and 104, of the spacer plate 100 through an inlet channel 900 associated with the first fluid, and into a channel 1041 formed by surface 1232 of an upper spacer plate 1052 and surface 1218 of a lower spacer plate 1051. The flow of the first fluid may split into two parts at point 238 shown in FIG. 3A. In some examples, the two parts may be equal halves. The first fluid may then enter an upper channel 1042 and a lower channel 1043. The upper channel 1042 may be formed by surface 229 of an upper plate 1050 and an upper membrane 302 of the upper plate 1050. The lower channel 1043 may be formed by surface 221 of a lower plate 1051 and a lower membrane 303 of the lower plate 1051. The upper channel 1042 may be coupled to an inner channel 1044 formed by the upper membrane 302 of the upper plate 1050 and the lower membrane 303 of the upper plate 1050. The lower channel may be coupled to another inner channel 1045 formed by the upper membrane 302 of the lower plate 1051 and the lower membrane 303 of the lower plate 1051.

The fluid traveling through the inner channel 1044 may then split into two parts at point 228 of the upper plate 1050. A portion may enter an upper channel 1046 and a portion may enter a lower channel 1047. The upper channel 1046 may be formed by surface 227 of the spacer plate 100 and the upper membrane 302 of the upper plate 1050. The lower channel 1047 may be formed by surface 226 of the spacer plate 100 and the lower membrane 303 of the upper plate 1050. The flows from both the upper channel 1046 and the lower channel 1047 may travel across the membrane plate assembly. At point 223 of the spacer plate 100, the flows traveling through the upper channel 1046 and the lower channel 1047 may recombine and exit through an outlet channel 900 associated with the first fluid to the outlet opening, for example the first outlet manifold 1055 formed by opening 102 and 104, of the spacer plate 100.

FIG. 9 is a broken cross-sectional view of a separation system along a second axis, according to some embodiments. A second fluid may enter from an inlet opening, for example the second inlet manifold 131 formed by opening 101 and 103, of the spacer plate 100 through an inlet channel 900 associated with the second fluid. The second fluid may be transported into the spacer sheet 304 of a lower plate 1163 trapped in a channel formed by surface 234 of the lower plate 1163 and surface 237 of an upper plate 1162. The second fluid may flow across the membrane plate assembly. The second fluid may exit through an outlet channel 900 associated with the second fluid and then exit through the outlet opening, for example the second outlet manifold 133 formed by opening 101 and 103, of the spacer plate 100.

Figure 10:
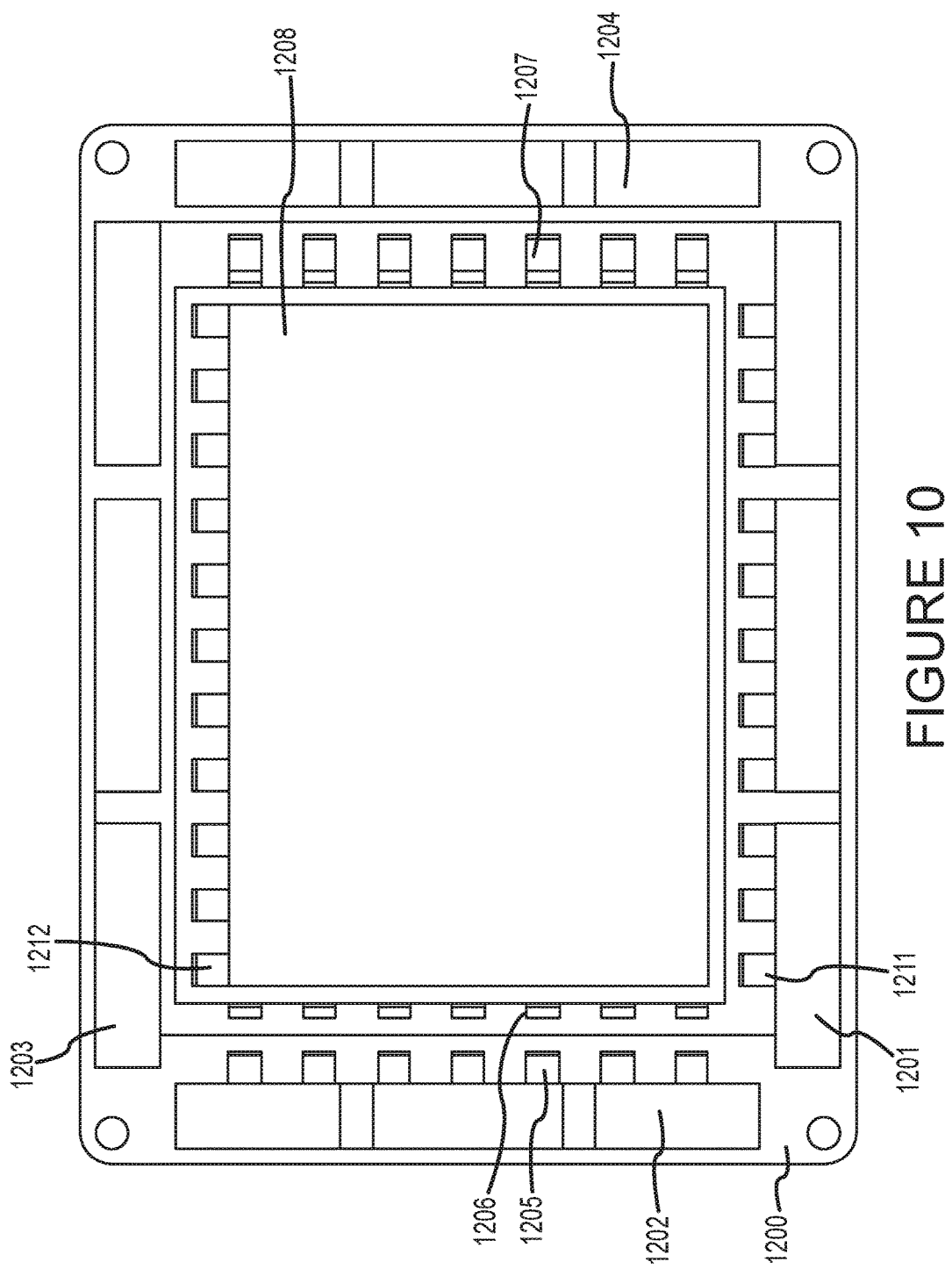
FIG. 10 is a top down view of a spacer plate of a separation system, according to some embodiments.

FIG. 10 is a top down view of a spacer plate 1200 of a separation system, according to some embodiments. It will be understood that spacer plate 1200 operates similarly to spacer plate 100 described above. Spacer plate 1200 may enhance the packing density of the membrane plate assemblies by minimizing dead space resulting from non-membrane materials. Instead of a separating sheet 1208 in the spacing region, spacer plate 1200 may include an internal membrane assembly 1208 in its spacing region. Thus, dead volume resulting from the separating sheet 108 may be avoided. In addition to improving the packing density of the membrane plate assemblies, this arrangement may increase the membrane sheet area by increasing the overall dimensions of the spacer plate 1200. It may be possible to increase the overall dimensions of the spacer plate 1200 while still satisfying minimum thickness and maximum area manufacturing requirements. The spacer plate 1200 may also reduce the plate cost per membrane area since the volume of material, for example plastic, that may be required to form the spacer plate 1200 may be reduced. The spacer plate 1200 may include no trapped features, which may allow it to be molded in a simple two part mold. Although the spacer plate 1200 depicted is square, it will be understood that other geometries may be used in other examples, including geometries having three, four, five, six, or more sides or being round.

The spacer plate 1200 may include an inlet opening, for example opening 1202, and an outlet opening, for example opening 1204, for a first fluid, for example a draw fluid. More than one inlet or outlet opening may be provided for the first fluid. In some examples, the inlet opening and the outlet opening may be on the opposite edges of the spacer plate 1200 so as to facilitate flow of the first fluid in a first direction across the spacer plate. The inlet opening and the outlet opening may be in fluid communication with regions between the membrane plate assemblies of the separation system. In some examples, the spacer plate 1200 may be in a first orientation, and the inlet opening may be opening 1202 and the outlet opening may be opening 1204. In some examples, the spacer plate may be in a second orientation, and the inlet opening may be opening 1204 and the outlet opening may be opening 1202. In some examples, the second orientation may be a 180° rotation of the spacer plate 1200 from the first orientation. Although some examples may show opening 1202 as an inlet opening and opening 1204 as an outlet opening or vice versa, it will be understood that opening 1202 and opening 1204 may be either an inlet or an outlet depending on the orientation of the spacer plate 1200.

In some examples, the inlet opening may be in fluid communication with the regions between the membrane plate assemblies by a first conduit, for example conduit 1205, that transports the first fluid to a second conduit, for example conduit 1206, that leads into the flow path across the spacing region 1208. After traveling across the spacing region, the first fluid may exit the spacer plate through a third conduit, for example conduit 1207, that may be in fluid communication with the outlet opening. In some examples, the inlet opening and/or the outlet opening may be in fluid communication with one or more fluid ports, as will be described below.

In some examples the one or more openings may include an inlet opening, for example opening 1201, and an outlet opening, for example opening 1203, for a second fluid, for example a feed fluid. More than one inlet or outlet may be provided for the second fluid. In some examples, the inlet opening and the outlet opening may be on the opposite edges of the spacer plate 1200 so as to facilitate flow of the second fluid in a in an orthogonal direction with respect to the first fluid across the spacer plate 1200. In some examples, the spacer plate 1200 may be in a first orientation, and the inlet opening may be opening 1202 and the outlet opening may be opening 1204. In some examples, the spacer plate may be in a second orientation, and the inlet opening may be opening 1204 and the outlet opening may be opening 1202. In some examples, the second orientation may be a 180° rotation of the spacer plate 1200 from the first orientation. Although some examples may show opening 1202 as an inlet opening and opening 1204 as an outlet opening or vice versa, it will be understood that opening 1202 and opening 1204 may be either an inlet or an outlet depending on the orientation of the spacer plate 1200.

In some examples, the inlet opening may be in fluid communication with the regions outside of the regions between the membranes and the inner membrane assembly 1208 by a first conduit, for example conduit 1212. The second fluid may exit the membrane plate assembly through a second conduit, for example conduit 1211. In some examples, the inlet opening and/or the outlet opening may be in fluid communication with one or more fluid ports, as will be described below.

In some examples, the one or more openings may be fitted with interconnects to define a parallel flow path or a series flow path. The interconnects may block the opening such that fluid cannot pass through in order to facilitate a series flow. The interconnects may allow flow through an opening to the spacer plate below in order to facilitate a parallel flow. In this manner, a series flow, a parallel flow, or combinations thereof may be established between a stack of spacer plates. In some examples, the interconnects may include nipples that may direct a fluid in a desired manner.

FIG. 11A is a cross-sectional view of a spacer plate 1200 of a separation system along a first axis, according to some embodiments. FIG. 11B is a cross-sectional view of a spacer plate 1200 of a separation system along a second axis, according to some embodiments. The spacer plate 1200 may include a first surface having one or more bonding areas. The bonding areas may be generally along the perimeter of the spacer plate 1200. In some examples, the bonding areas may be where an element of the separation system, for example a membrane or another spacer plate 1200, may be coupled to the spacer plate 1200. The element of the separation system may be coupled to the spacer plate 1200 using an adhesive (e.g. pressure sensitive adhesive), by welding (e.g., thermal or ultrasonic weld), a glued line, a fold in material, and/or any other known mechanism. The coupling may provide a fluidic seal. In some examples, a first bonding area of the first surface of the spacer plate 1200 may include surfaces 1320, 1342, 1350 and 1367. In some examples, a second bonding area of the first surface of the spacer plate 1200 may include surfaces 1325 and 1340, and may be staggered (e.g., asymmetrically arranged) about the second axis. The first and second bonding areas may be used to couple a first spacer plate 1200 and a second spacer plate 1200.

The spacer plate 1200 may include a second surface having similar bonding areas to the first surface. The second surface may be located on an opposite side of the spacer plate 1200 relative to the first surface. The second surface of the first spacer plate 1200 may bond to the first surface of a second spacer plate 1200 as will be described below. In some examples, a first bonding area of the second surface of the spacer plate 1200 may include surfaces 1321, 1343, 1351 and 1368. In some examples a second bonding area of a second surface of the spacer plate 1200 may include surfaces 1323 and 1337, and may be staggered (asymmetrically arranged) about the second axis of spacer plate 1200.

The spacer plate 1200 may also include bonding areas for coupling the spacer plate 1200 with a membrane 1403. These bonding areas may include surfaces 1327 and 1338, which may be staggered about the second axis, and surfaces 1356 and 1366, which may be staggered about the first axis. The spacer plate 1200 may also include bonding areas for coupling the spacer plate 1200 with a membrane 1406. These bonding areas may include surfaces 1329 and 1333, which may be symmetrical about the second axis, and surfaces 1358 and 1364, which may be staggered about the first axis. The spacer plate 1200 may also include bonding areas for coupling the spacer plate 1200 with a membrane 1408. These bonding areas may include surfaces 1330 and 1334, which may be symmetrical about the second axis, and surfaces 1355 and 1361, Which may be staggered about the first axis. The spacer plate 1200 may also include bonding areas for coupling the spacer plate 1200 with a membrane 1410. These bonding areas may include surfaces 1323 and 1337, which may be staggered about the second axis, and surfaces 1353 and 1363, which may be staggered about the first axis.

Figure 12:
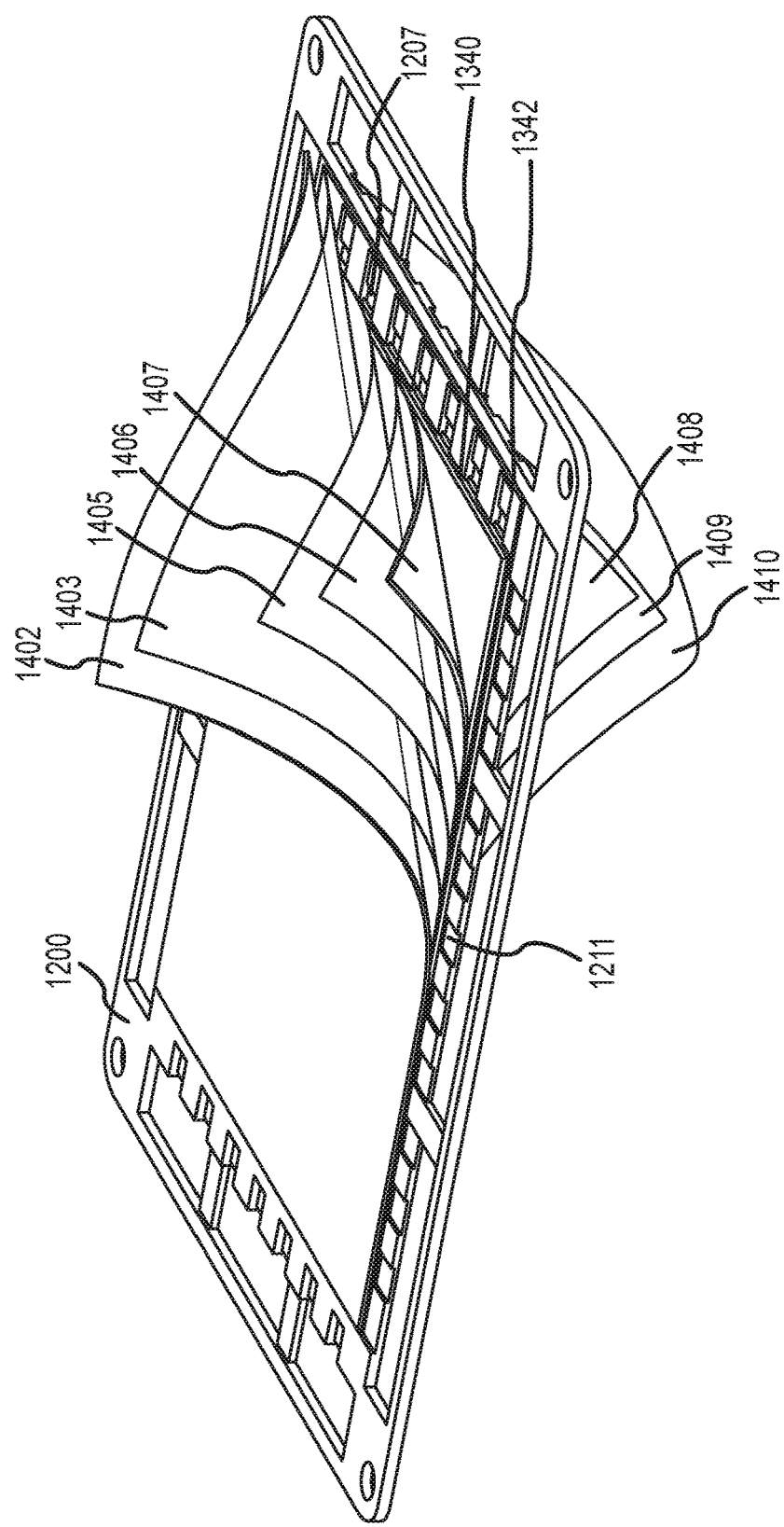
FIG. 12 is an isometric view of a membrane plate assembly of a separation system, according to some embodiments.

FIG. 12 is an isometric view of a membrane plate assembly of a separation system, according to some embodiments. The membrane plate assembly may include the spacer plate 1200, a spacer sheet 1402 (also referred to herein as "first spacer sheet"), a first membrane 1403, and a second membrane 1410. The spacer sheet 1402 may be similar to the spacer sheet 304 described above. In addition, the first membrane 1403 (also referred to herein as "upper outer membrane") and the second membrane 1410 (also referred to herein as "lower outer membrane") may be similar to the first membrane 302 and the second membrane 303 described above. The membrane plate assembly may also include an inner membrane assembly 1208. The inner membrane assembly may be a multi-layer assembly including a second spacer sheet 1407, a third membrane 1406 (also referred to herein as "upper inner membrane") on a first side of the second spacer sheet 1407, a third spacer sheet 1405 on a side of the third membrane 1406 opposite the second spacer sheet 1407, a fourth membrane 1408 (also referred to herein as "lower inner membrane) on a second side of the second spacer sheet 1407, and a fourth spacer sheet 1409 on a side of the fourth membrane 1408 opposite the second spacer sheet 1407. In some examples, the first membrane 1403, the second membrane 1410, the third membrane 1406 and the fourth membrane 1408 may be forward osmosis membranes.

Figure 13:
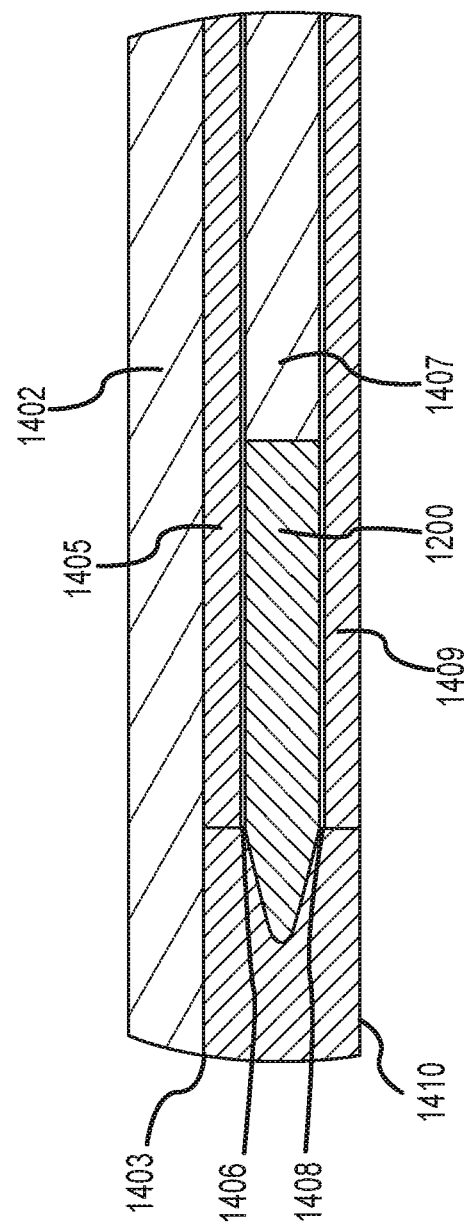
FIG. 13 is a cross-sectional view of a membrane plate assembly of a separation system, according to some embodiments.

FIG. 13 is a cross-sectional view of a membrane plate assembly of a separation system, according to some embodiments. FIG. 13 shows the relatively small amount of space occupied by the spacer plate 1200 and the relatively large amount of space occupied by the membranes and spacers. The high proportion of spacers and membranes relative to dead space from the spacer plate 1200 results in a higher packing density and a higher level of separation that may be carried out in a given amount of space.

Figure 17:
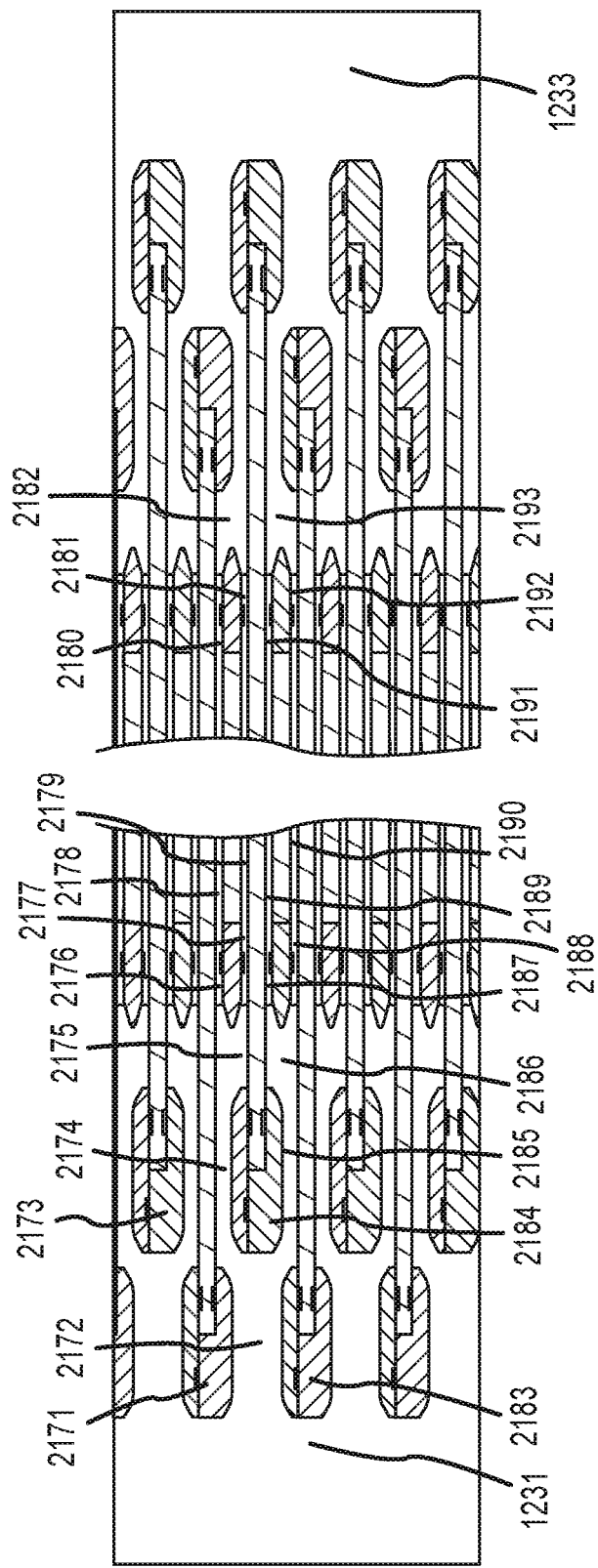
FIG. 17 is a cross-sectional view of a separation system along a first axis, according to some embodiments.

The lower surface of the first spacer sheet 1402 may be in contact with the upper surface of an upper outer membrane 1403 of a lower plate 2184 (See FIG. 17). The upper surface of the first spacer sheet 1402 may be in contact with the lower surface of a lower outer membrane 1410 of an upper plate 2171. The upper plate 2171 may separate the upper outer membrane 1403 from the lower outer membrane 1410, and may provide a structured flow path between them. The lower surface of the third spacer sheet 1405 may be in contact with the upper surface of the upper inner membrane 1406. The upper surface of the third spacer sheet 1405 may be in contact with the lower surface of the upper outer membrane 1403. The third spacer sheet 1405 may separate the upper outer membrane 1403 from the upper inner membrane 1406, and may provide a structured flow path between them. The lower surface of the second spacer sheet 1407 may be in contact with the upper surface of the lower inner membrane 1408. The upper surface of the second spacer sheet 1407 may be in contact with the lower surface of the upper inner membrane 1406. The second spacer sheet 1407 may separate the lower inner membrane 1408 from the upper inner membrane 1406, and provide a structured flow path between them. The lower surface of a fourth spacer sheet 1409 may be in contact with the upper surface of the lower outer membrane 1410. The upper surface of the fourth spacer sheet 1409 may be in contact with the lower surface of the lower inner membrane 1408. The fourth spacer sheet 1409 may separate the lower outer membrane 1410 from the lower inner membrane 1408, and provide a structure flow path between them.

Figure 14:
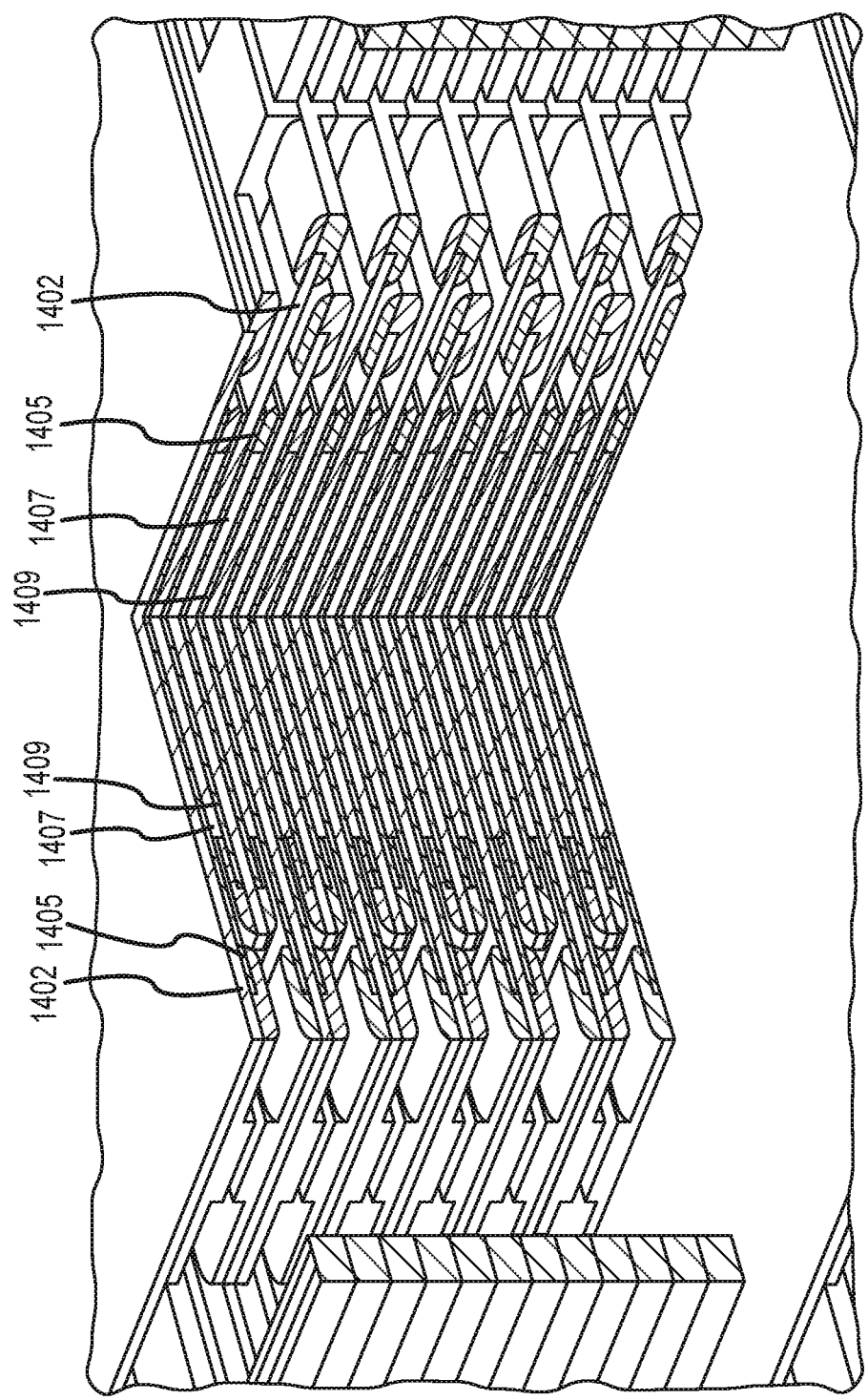
FIG. 14 is a sectional view of a separation system, according to some embodiments.

FIG. 14 is a sectional view of a separation system, according to some embodiments. Like FIG. 13, FIG. 14 shows the relatively small amount of space occupied by the spacer plate 1200 and the relatively large amount of space occupied by the membranes and spacers. The membrane plate assemblies may be stacked, whereby one or more openings of the spacer plates 1200 may be arranged to be aligned with one another. Any number of membrane plate assemblies may be stacked to form an element, including 1, 2, 3, 4, 5, 6, 7, 8, 9, or 10 membrane plate assemblies, or more in other examples. Adjacent membrane plate assemblies in the stack may have having alternating orientations and may have membranes staggered in position with respect to one another, as shown in examples described herein. In some examples, the one or more openings aligned with one another may allow a fluid to be in fluid communication with multiple conduits of the spacer plates 1200 of each of the membrane plate assemblies in the stack. In this manner, parallel flow may be achieved. In some examples, the openings of one of the spacer plates 1200 may be blocked to force all of the fluid to pass through the conduits of that spacer plate 1200. In this manner, series flow may be achieved.

The spacer plates 1200 may be stacked by coupling the plates together at their bonding areas, as described above. Perimeter plate to plate coupling may be achieved by joining surface 1320 of a lower plate 2184 (See FIG. 17) to surface 1343 of an upper plate 2171 and joining surface 1342 of the lower plate 2184 to surface 1321 of the upper plate 2171. Joining the surfaces of the spacer plates 1200 in this manner may result in an alternating arrangement of the spacer plates 1200 in which each spacer plate 1200 is rotated 80° about a third axis with respect to the spacer plate 1200 adjacent to it, Perimeter plate to plate coupling may separate the fluid flow paths from the outside world. In addition, internal plate to plate coupling may be achieved by joining surface 1340 of the lower plate 2184 to surface 1323 of the upper plate 2171 and surface 1325 of the lower plate 2184 to surface 1337 of the upper plate 2171. Internal plate to plate coupling may separate the first fluid flow path and the second fluid flow path. Both the perimeter plate to plate coupling and the internal plate to plate coupling may include joining the plates along the entire width of the spacer plate 1200.

Figure 15:
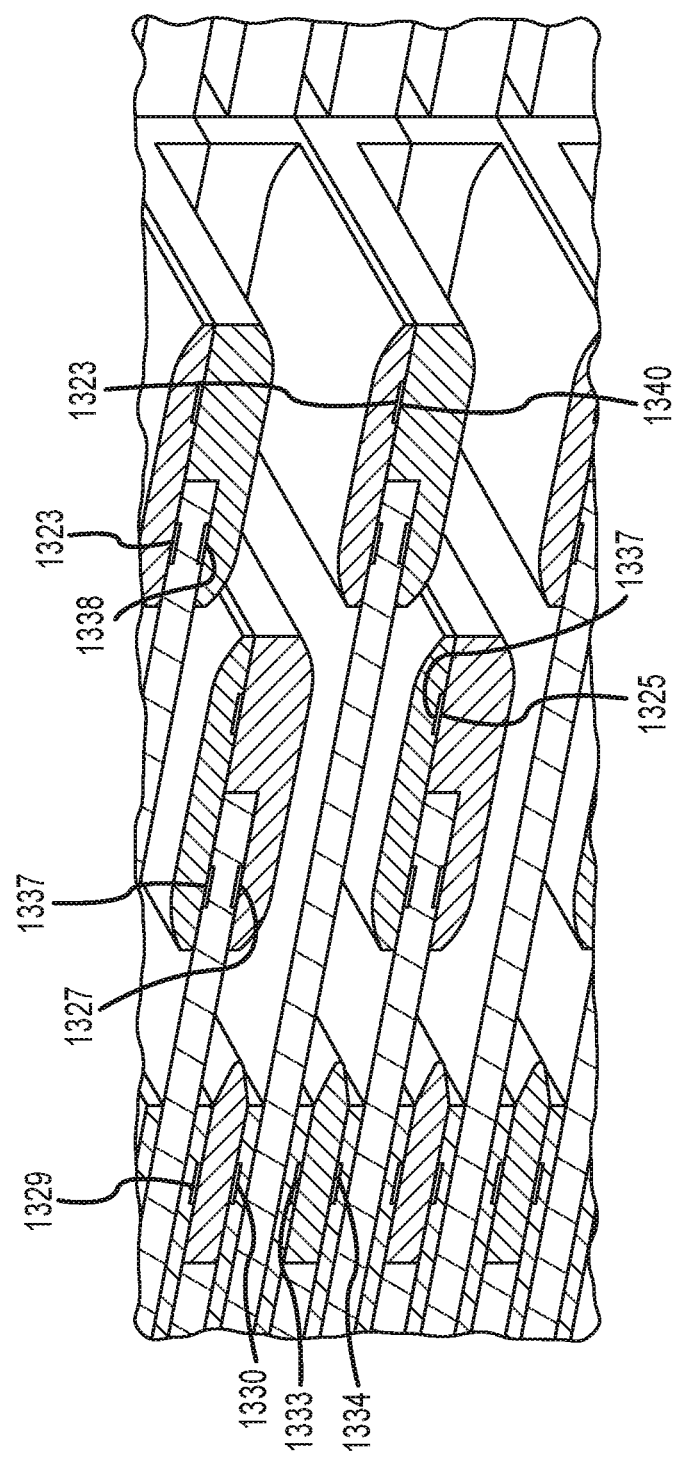
FIG. 15 is the sectional view of FIG. 14 showing bonding between multiple membrane plate assemblies of the separation system along a first axis, according to some embodiments.
Figure 16:
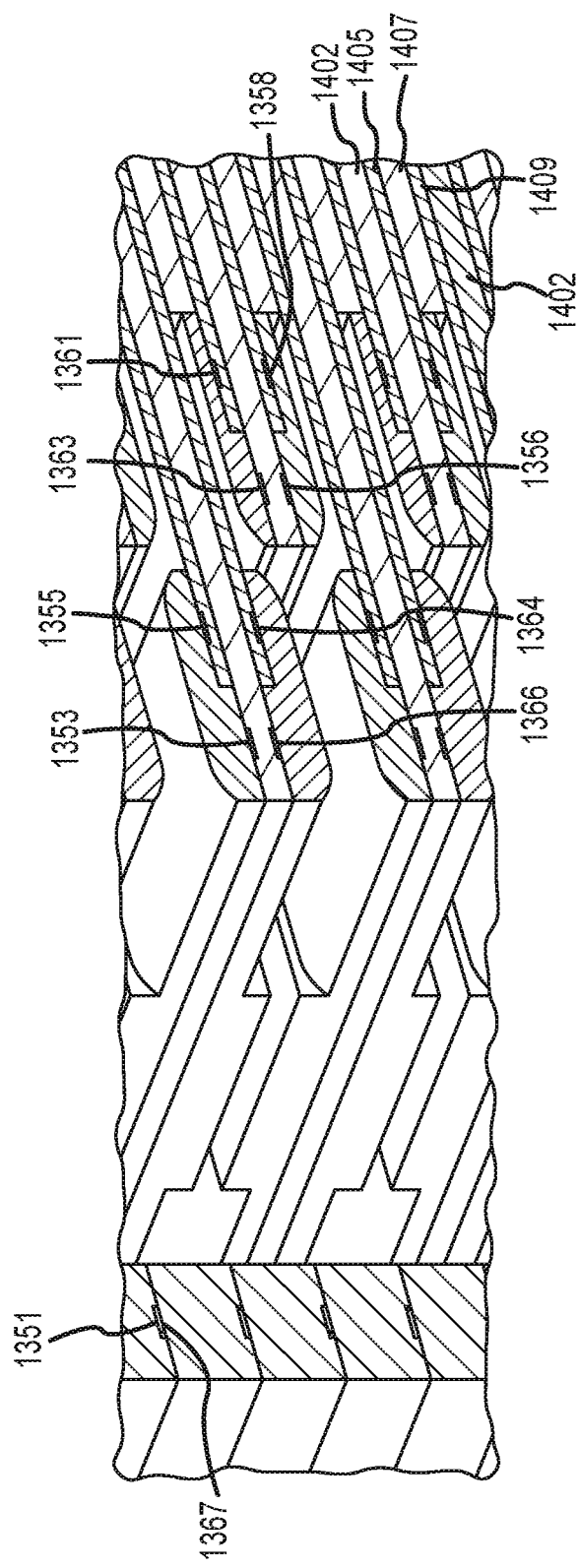
FIG. 16 is the sectional view of FIG. 14 showing bonding between multiple membrane plate assemblies of the separation system along a second axis, according to some embodiments.

FIG. 15 is the sectional view of FIG. 14 showing bonding between multiple membrane plate assemblies of the separation system along a first axis, according to some embodiments. FIG. 16 is the sectional view of FIG. 14 showing bonding between multiple membrane plate assemblies of the separation system along a second axis, according to some embodiments. The membranes of the membrane plate assemblies in the stack may be staggered with respect to one another. It may be advantageous to stagger the membranes to improve packing efficiency and due to manufacturing considerations. Staggering may be achieved by an asymmetric arrangement of surfaces, as shown in FIGS. 11A and 11B. In some examples, the spacer plates 1200 may alternate in orientation to achieve the staggered arrangement. The asymmetric arrangement of surfaces of the spacer plate 1200 may provide inner plate-to-plate bonding areas on both sides of the spacer plate 1200 that are the same distance apart, but positioned at different points along the spacer plate 1200. In some examples, the spacer plates 100 may alternate in orientation to achieve the staggered arrangement. For example, the distance between surface 1325 and surface 1340 may be the same as the distance as the distance between surface 1323 and surface 1337. This may allow for surface 1325 of a first plate to join with surface 1337 of a second plate while surface 1340 of the first plate joins with surface 1323 of the second plate. As shown in FIG. 11A, surface 1325 may not be aligned with surface 1323 and surface 1340 may not be aligned with surface 1337. This offset may create a staggered arrangement. Continuing with the previous example, surface 1323 of the first plate may join with surface 1340 of a third plate and surface 1337 of the first plate may join with surface 1325 of the third plate. The second plate and third plate may be in alignment because the first plate may have been rotated 180° about a third axis with respect to the second plate and the third plate may have been rotated 180° about the third axis with respect to the first plate. By using an asymmetric arrangement of surfaces and staggering the membrane plate assemblies, it may be feasible to injection mold the spacer plates 1200 out of one piece while maintaining a desired number of openings, for example four openings, and desired number of distinct flow paths, for example two distinct flow paths. In this manner, trapped features may be avoided, thereby enhancing manufacturing efficiency and packing density.

The upper outer membrane 1403 may form a membrane to plate bond on surfaces 1327, 1338, 1356, and 1366 of the spacer plate 1200. The upper inner membrane 1406 may form a membrane to plate bond on surfaces 1329, 1333, 1358, and 1364 of the spacer plate 1200. The lower inner membrane 1408 may form a membrane to plate bon on surfaces 1330, 1334, 1355, and 1361 of the spacer plate 1200. The lower outer membrane 1410 may form a membrane to plate bond on surfaces 1323, 1337, 1353, and 1363 of the spacer plate 1200. The membrane to plate bond for the upper outer membrane 1403, the upper inner membrane 1406, the lower inner membrane 1408, and the lower outer membrane 1410 may be provided around the entire perimeter of the membrane.

FIG. 17 is a cross-sectional view of a separation system along a first axis, according to some embodiments. In some examples, a first fluid, for example a draw fluid, may enter the membrane plate assembly from the inlet opening, for example an inlet manifold 1231 formed by openings 1201 and 1203, and travel through an inlet channel associated with the first fluid, and into a channel 2172 formed by surface 1339 of an upper place 2171 and surface 1322 of a lower plate 2184. The fluid flow path may be split into two halves at point 1324, whereby it enters an upper channel 2174 and a lower channel 2185. The upper channel 2174 may be formed by surface 1336 of the upper plate 2171 and the upper outer membrane 1403 of the upper plate 2171. The lower channel 2185 may be formed by surface 1326 of the lower plate 2184 and the lower outer membrane 1410 of the lower plate 2184.

The upper channel 2174 may direct the first fluid to a channel 2175 formed by the upper outer membrane 1403 of the upper plate 2171 and the lower outer membrane 1410 of the upper plate 2171. The lower channel 2185 may direct the first fluid to a channel 2186 formed by the upper outer membrane 1403 of the lower plate 2184 and the lower outer membrane 1410 of the lower plate 2184. The channel 2175 may then split into two halves at point 1335 of the upper plate 2171, whereby it may enter an upper channel 2176 or a lower channel 2177. The upper channel 2176 may be formed by surface 1333 of the spacer plate 1200 and the upper outer membrane 1403 of the upper plate 2171. The lower channel 2177 may be formed by surface 1334 of the spacer plate 1200 and the lower outer membrane 1410 of the upper plate 2171.

The upper channel 2176 may direct the first fluid to a channel 2178, which is formed by the upper outer membrane 1403 and the upper inner membrane 1406 of an upper plate 2171, whereby the first fluid may travel through the third spacer sheet 1405. The lower channel 2177 may direct the first fluid to a channel 2179, which is formed by the lower outer membrane 1410 and the lower inner membrane 1408 of the upper plate 2171, whereby the first fluid may travel through fourth spacer sheet 1409. The flows through channel 2178 and channel 2179 may transport the first fluid across the spacer plate 1200 contacting the membranes. At point 1328 of the spacer plate 1200, channel 2178 and channel 2179 recombine ad the first fluid may exit through the outlet opening 1203 following a similar path through the outlet channels. In some examples, the flow entering the outlet opening 1203 may interact with merging flows from the upper plate 2173. The upper stream may not meet the lower stream 2186 until they have both reached outlet opening, for example outlet manifold 1233 formed by openings 1201 and 1203.

Figure 18:
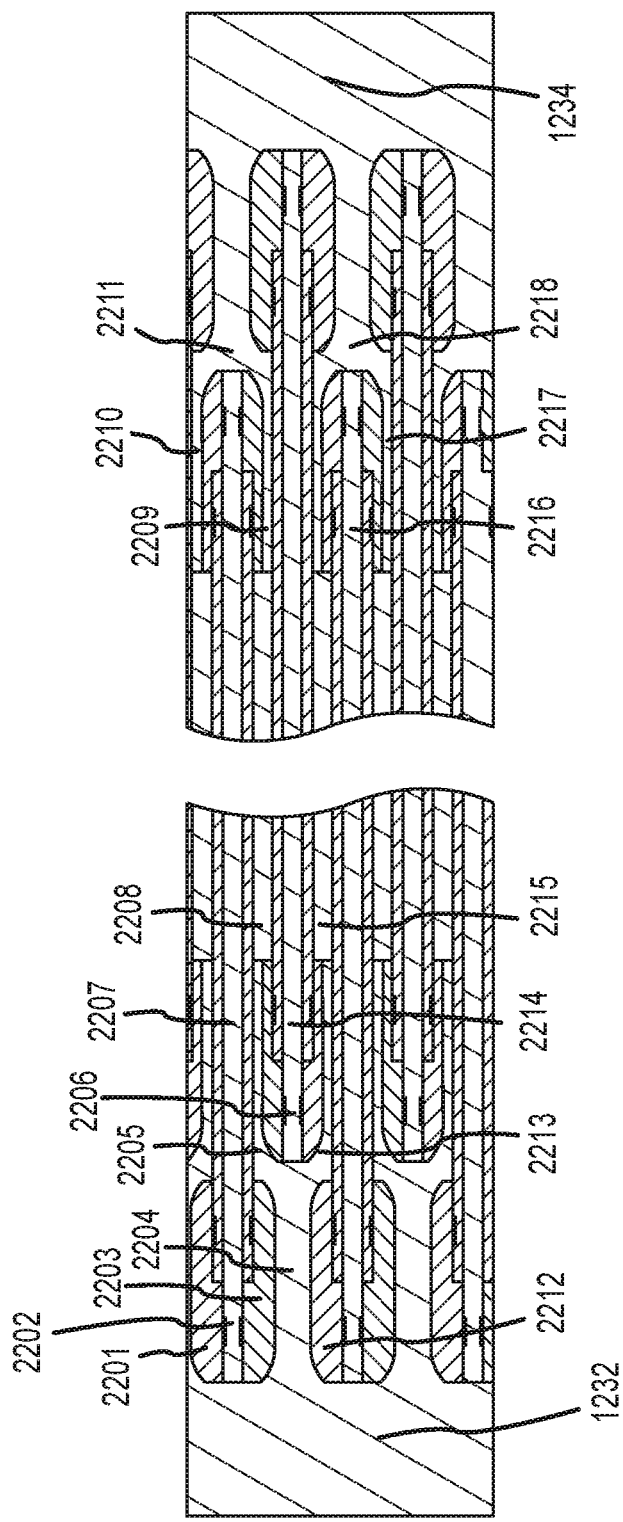
FIG. 18 is a cross-sectional view of a separation system along a second axis, according to some embodiments.

FIG. 18 is a cross-sectional view of a separation system along a second axis, according to some embodiments. In some examples, a second fluid, for example a feed fluid, may enter from the inlet opening, for example inlet manifold 1232 formed by openings 1202 and 1204, through an inlet channel associated with the second fluid into channel 2202 formed by surface 1353 of an upper plate 2201 and surface 1366 of a center plate 2203, and into channel 2204 formed by surface 1365 of a center plate 2203 and surface 1354 of a lower plate 2212. Channel 2204 may split into three even paths: an upper flow path 2204, a center flow path 2206, and a lower flow path 2213. The upper flow path 2205 may be formed by surface 1362 and the upper inner membrane 1406 of the center plate 2203. The center flow path 2206 may be formed by surface 1363 of the center plate 2203 and surface 1356 of the lower plate 2212. The lower flow path 2213 may be formed by surface 1326 and the lower inner membrane 1408 of the lower plate 2212.

Channel 2202 may direct the second fluid into a channel formed by the lower outer membrane 1410 of the upper plate 2201 and the upper outer membrane 1403 of the center place 2203. The second fluid may then flow through the first spacer sheet 1402 of the center plate 2203. The upper flow path 2205 may lead to channel 2208, which is formed by the upper inner membrane 1406 and the lower inner membrane 1408 of the center plate 2203. Channel 208 may direct the second fluid through the second spacer sheet 1407 of the center plate 2203. Channel 2208 may then direct the second fluid to channel 2209, which may be formed by surface 1357 and the lower inner membrane 1408 of the center plate 2203. Channels 2207, 2209 and 2210 may then combine in channel 2211, and exit to the outlet opening, for example outlet manifold 1234 formed by openings 1202 and 1204.

The center flow path 2206 may enter channel 2214 formed by the lower outer membrane 1410 of the center plate 2203 and the upper outer membrane 1403 of the lower plate 2212. Channel 114 may direct the second fluid through the first spacer sheet 1402 of the lower plate 2212. Channel 2214 may direct the second fluid to the outlet opening.

The lower flow path 2213 may enter channel 2215, which may be formed by the upper inner membrane 1406 and the lower inner membrane 1408 of the lower plate 2212. Channel 2215 may direct the second fluid through the second spacer sheet 1407 of the lower plate 2212. Channels 2215, 2216, and 2217 may then combine n channel 2218, and exit to the outlet opening.

Figure 19:
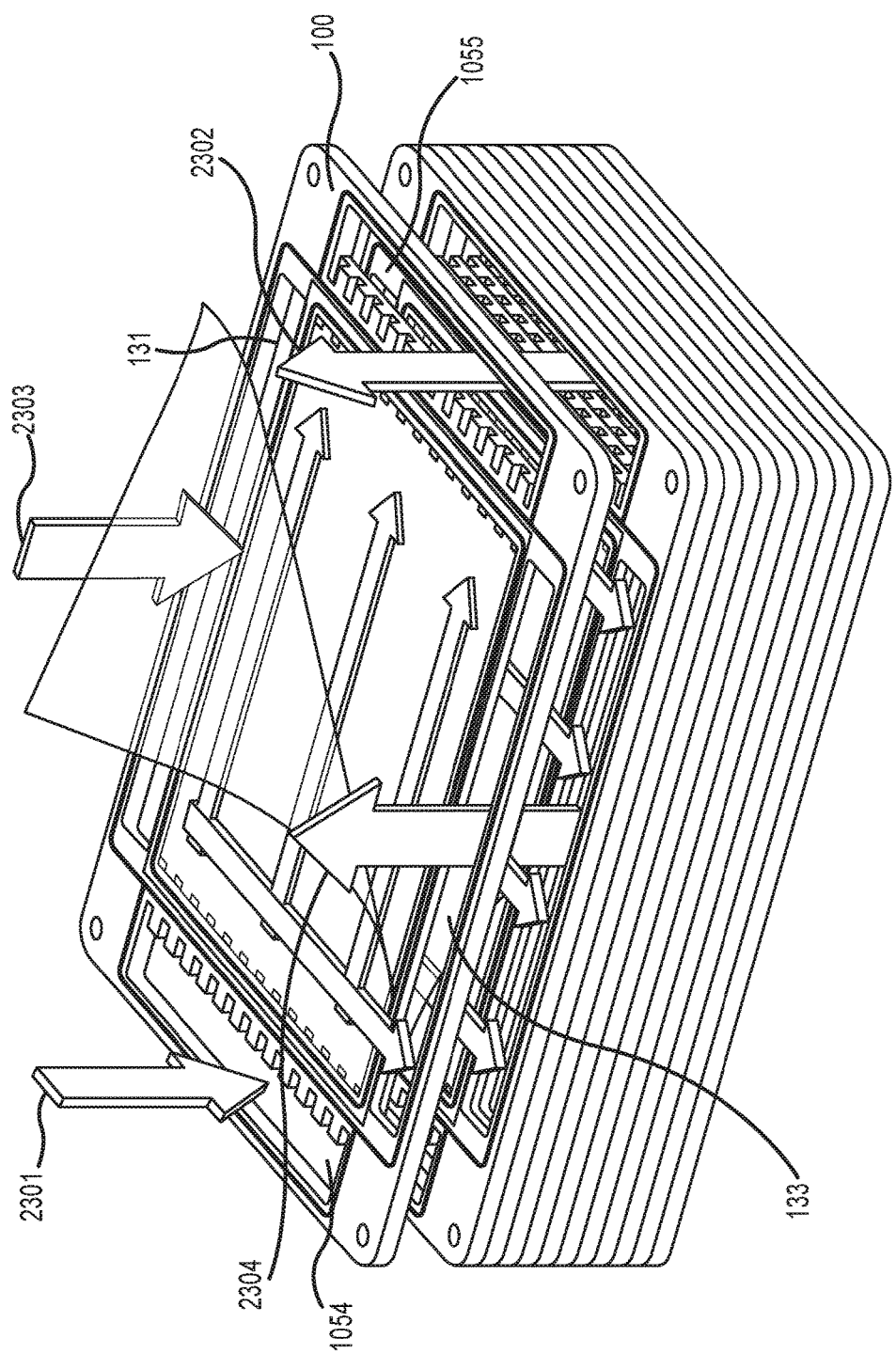
FIG. 19 is an isometric view of a separation system showing flow paths within the separation system, according to some embodiments.

FIG. 19 is an isometric view of a separation system showing flow paths within the separation system, according to some embodiments. The one or more openings may direct a fluid from a first side of a membrane plate assembly to a second side of the membrane plate assembly. A flow path of the first fluid, for example a draw fluid, may be along a first axis. In some examples, the first side and the second side may be opposite edges of the spacer plate 100. For example, a first fluid inlet flow path 2301 may direct a first fluid from outside the separation system to the first inlet manifold 1054 of the separation system, as described above. The first fluid may enter the membrane plate assembly through the inlet channel and flow along a first axis and out through first outlet manifold 1055 of the separation system. A first fluid outlet flow path 2302 may direct the first fluid exiting each spacer plate 100 out of the separation system.

A flow path of the second fluid, for example a feed fluid, may be along a second axis. In some examples, the second axis may be orthogonal to the first axis. In some examples, the second axis may be at a different angle with respect to the first axis. In some examples, the first side and the second side may be opposite edges of the spacer plate 100. For example, a second fluid inlet flow path 2303 may direct a first fluid from outside the separation system to the second inlet manifold 131 of the separation system, as described above. The first fluid may enter the membrane plate assembly through the inlet channel and flow along a second axis and out through second outlet manifold 133 of the separation system. A second fluid outlet flow path 2304 may direct the second fluid exiting each spacer plate 100 out of the separation system.

In some examples, air bubbles may be introduced, flowing through the feed flow path, to reduce the propensity of membrane fouling in the separation system.

Figure 20:
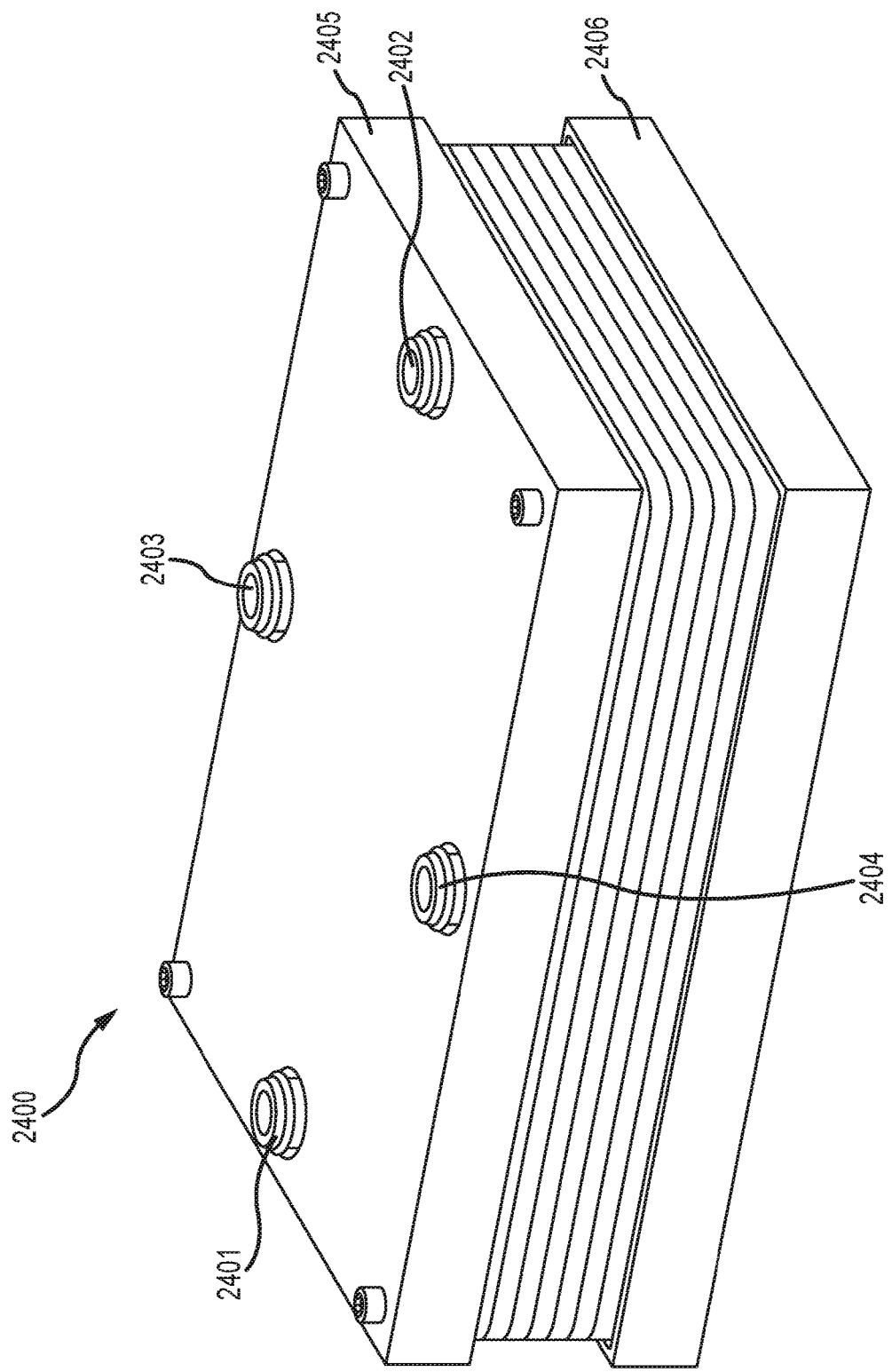
FIG. 20 is an isometric view of a separation system, according to some embodiments.
Figure 22A:
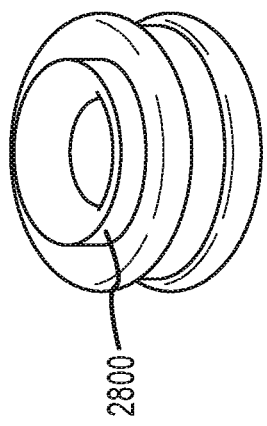
FIG. 22A is an isometric view of a nipple of a separation system, according to some embodiments.
Figure 22D:
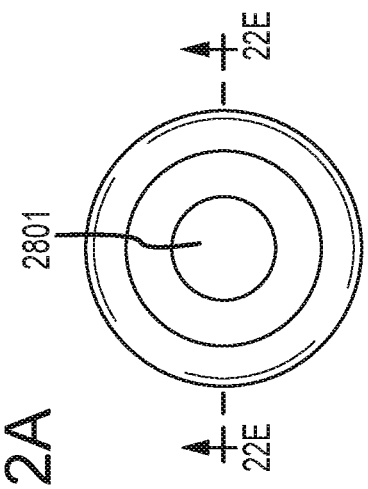
FIG. 22D is a top down view of an open nipple, according to some embodiments.
Figure 22E:
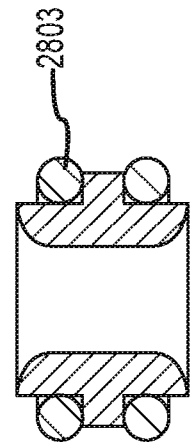
FIG. 22E is a cross-sectional view of an open nipple, according to some embodiments.
Figure 22B:
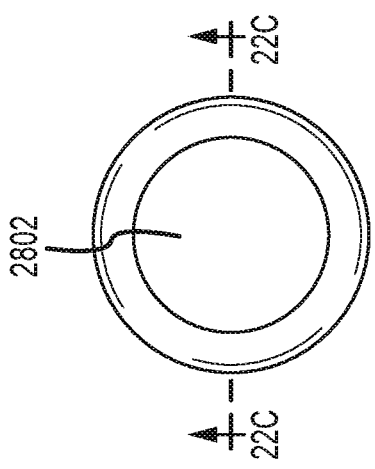
FIG. 22B is a top down view of a closed nipple, according to some embodiments.
Figure 22C:
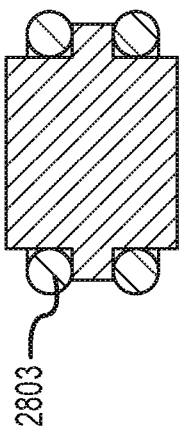
FIG. 22C is a cross-sectional view of a closed nipple, according to some embodiments.

FIG. 20 is an isometric view of a membrane element 2400, according to some embodiments. Assembly of the membrane element 2400 may be completed by adhering a foot plate 2406 and a head plate 2405. The head plate 2405 and foot plate 2406 may be sealed, for example, with a mechanical seal, adhesive seal or weld. The foot plate may seal the bottom of the membrane element 2400, The head plate 2405 may provide a sealing surface for the one or more openings of the spacer plates and may supply plumbing options, for example fluid ports. The head plate 2405 may be positioned at the top of the membrane element 2400, and may include one or more fluid ports coupled to the one or more openings. A first fluid port 2401 may be provided to receive a first fluid, for example a feed fluid, and transport it to a first inlet manifold 1054 of the separation system. A second fluid port 2402 may provide an outlet for first fluid that has passed through the membrane element 2400 and into the first outlet manifold 1055 of the separation system. In some examples, the second fluid port 2402 may be located on the foot plate 2406. A third fluid port 2403 may be provided to receive a second fluid, for example a draw fluid, and transport it to a second inlet manifold 131 of the separation system A fourth fluid port 2404 may provide an outlet for second fluid that has passed through the membrane element 2400 and into the second outlet manifold 133 of the separation system. Other ports may also be present, or multiple ports used per inlet and outlet in some examples. FIG. 21A is cross-sectional view of a membrane element 2400 stacked in parallel, according to some embodiments. Examples of separation systems described herein may maintain a flow path for four port elements while increasing packing density, increasing yields and decreasing head losses in some examples. This may result in a substantially lower head loss due to an improved flow path, in some examples multiple membrane elements 2400 may be coupled by aligning their fluid ports. A top plate first fluid port 2501 may direct a first fluid to a first fluid port 2401 of the head plate of a first membrane element 2400. The first fluid may then pass through the first membrane element 2400. The first fluid may then pass to a membrane element 2400 by exiting the first membrane element 2400 through a second fluid port 2402 located on the foot plate of the first membrane element 2400. The second fluid port 2402 may be coupled to first fluid port 2401 of a second membrane element 2400 positioned beneath the first membrane element 2400. Similarly, the first fluid may pass through a third membrane element 2400. For a parallel configuration, all the first fluid ports 2401 and second fluid ports 2402 may be on a first side of each membrane element 2400. The first fluid may pass through each membrane element 2400 in a similar fashion and may be plumbed through a top plate second fluid port 2502. In some examples, the fluid ports of the membrane elements 2400, top plate, and/or bottom plate may include interconnects, for example open nipples 2801 or closed nipples 2802.

A top plate third fluid port 2503 may direct a second fluid to a third fluid port 2403 of the head plate of a first membrane element 2400. The second fluid may then pass through the first membrane element 2400. The second fluid may then pass to a second membrane element 2400 by exiting the first membrane element 2400 through a fourth fluid port 2404 located on the foot plate of the first membrane element 2400. The fourth fluid port 2404 may be coupled to the third fluid port 2403 of a second membrane element 2400 positioned beneath the first membrane element 2400. Similarly, the first fluid may pass through a third membrane element 2400. For a parallel configuration, all the third fluid ports 2403 and fourth fluid ports 2404 may be on a first side of each membrane element 2400. The second fluid may pass through each membrane element 2400 in a similar fashion and may be plumbed through a top plate fourth fluid port 2504.

In one example of a parallel configuration, all fluid ports on a first side of the stack except a bottom fluid port may be fitted with open nipples 2801. The bottom fluid port on the first side may be fitted with a closed nipple 2802. All fluid ports on a second side of the stack except the top fluid port may be fitted with open nipples 2801. The top fluid port on the second side may be fitted with a closed nipple.

FIG. 21B is a cross-sectional view of a membrane element 2400 stacked in series, according to some embodiments. A top plate first fluid port 2501 may direct a first fluid to a first fluid port 2401 of the head plate of a first membrane element 2400. The first fluid may then pass through the first membrane element 2400. The first fluid may then pass to a second membrane element 2400 by exiting the first membrane element 2400 through a second fluid port 2402 located on the foot plate of the first membrane element 2400. The second fluid port 2402 may be coupled to first fluid port 2401 of a second membrane element 2400 positioned beneath the first membrane element 2400. Similarly, the first fluid may pass through a third membrane element 2400. For a series configuration, the first fluid ports 2402 and second fluid ports 2402 of each membrane element 2400 may alternate between a first side and a second side of the membrane element 2400. After passimg through the membrane element 2400, the first fluid may directly exit the last membrane element 2400 through its second fluid port 2402, or may pass through a bottom plate. Alternately, the first fluid may be routed back to the top plate and may flow out through the top plate second fluid port 2502.

A top plate third fluid port 2503 may direct a second fluid to a third fluid port 2403 of the head plate of a first membrane element 2400. The second fluid may then pass through the first membrane element 2400. The second fluid may then pass to a second membrane element 2400 by exiting the first membrane element 2400 through a fourth fluid port 2404 located on the foot plate of the first membrane element 2400. The fourth fluid port 2404 may be coupled to the third fluid port 2403 of a second membrane element 2400 positioned beneath the first membrane element 2400. Similarly, the first fluid may pass through a third membrane element 2400. For a series configuration, the third fluid ports 2403 and fourth fluid ports 2404 of each membrane element 2400 may alternate between a first side and a second side of the membrane element 2400. After passing through the membrane element 2400, the second fluid may directly exit the last membrane element 2400 through its fourth fluid port 2404, or may pass through a bottom plate. Alternately, the second fluid may be routed back to the top plate and may flow out through the top plate fourth fluid port 2504.

In one example of a series configuration, the fluid ports on a first side of the stack may alternate between being fitted with open nipples 2801 and closed nipples 2802. Similarly, the fluid ports on a second side of the stack may alternate between being fitted with open nipples 2801 and closed nipples 2802, in which the first and second side may have alternating types of nipples. For example, whenever a fluid port on the first side is fitted with an open nipple 2801, the corresponding fluid port on the second side may be fitted with a closed nipple 2802.

Figure 23:
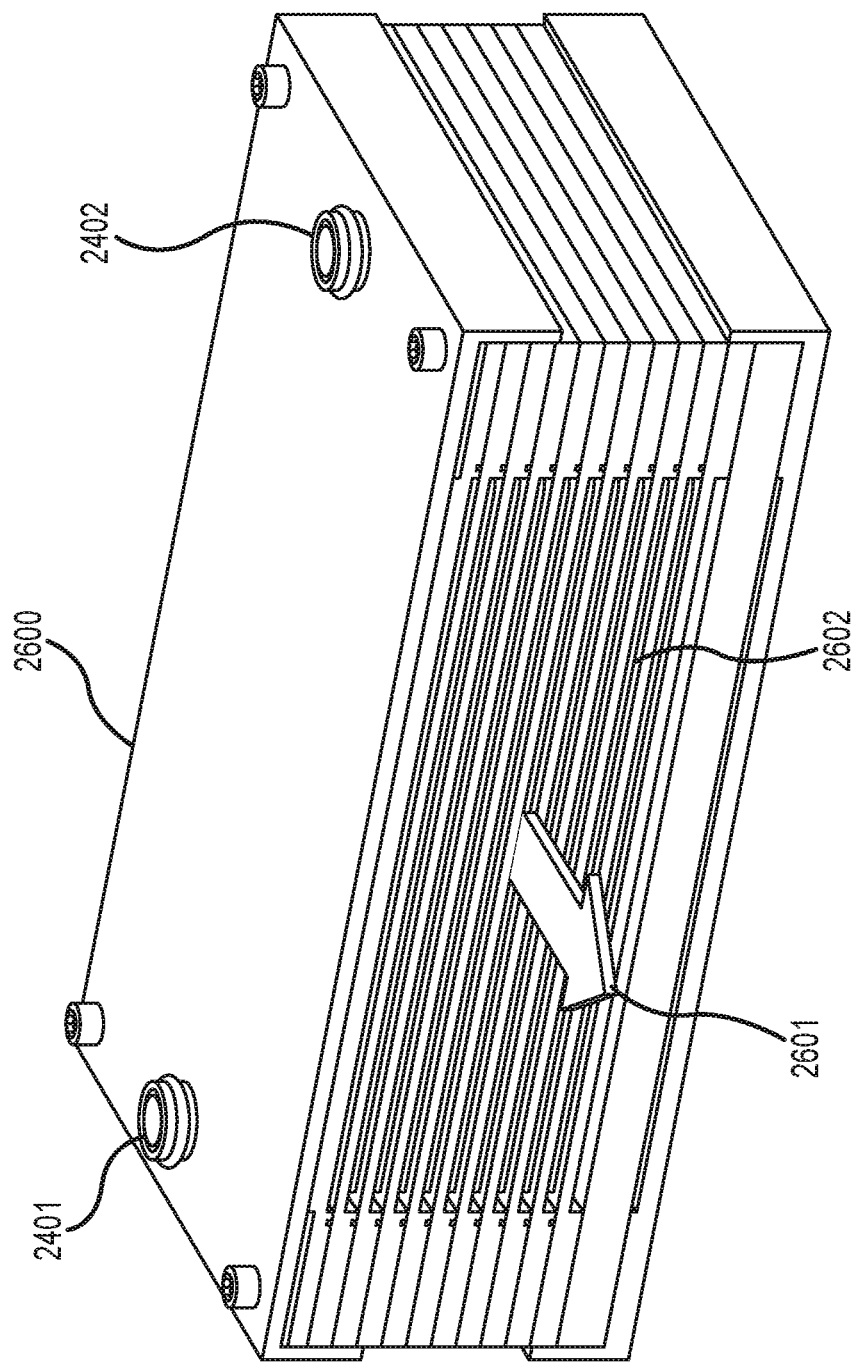
FIG. 23 is an isometric view of a separation system, according to some embodiments.

FIG. 23 is an isometric view of a membrane element 2400, according to some embodiments. In some examples, a partially enclosed membrane element 2400 may be immersed in a first fluid. In this configuration, the one or more openings associated with a first fluid may be exposed, thereby allowing the first fluid to enter and exit the membrane element 2400. The membrane element 2400 may include a first fluid port 2401 and a second fluid port 2402 to plumb a second fluid through the membrane element 2400. In some examples, the first fluid may be a feed fluid and the second fluid may be a draw fluid. The membrane element 2400 may be immersed in the feed fluid, allowing the feed fluid to pass through the membrane element 2400. The draw fluid may be plumbed through the membrane element 2400 as described above. Alternatively, the membrane element 2400 may be immersed in the draw fluid while the feed fluid may be plumbed into the membrane element 2400 by fluid ports, as described above. It may be advantageous to use this configuration for membrane bioreactors.

Figure 24:
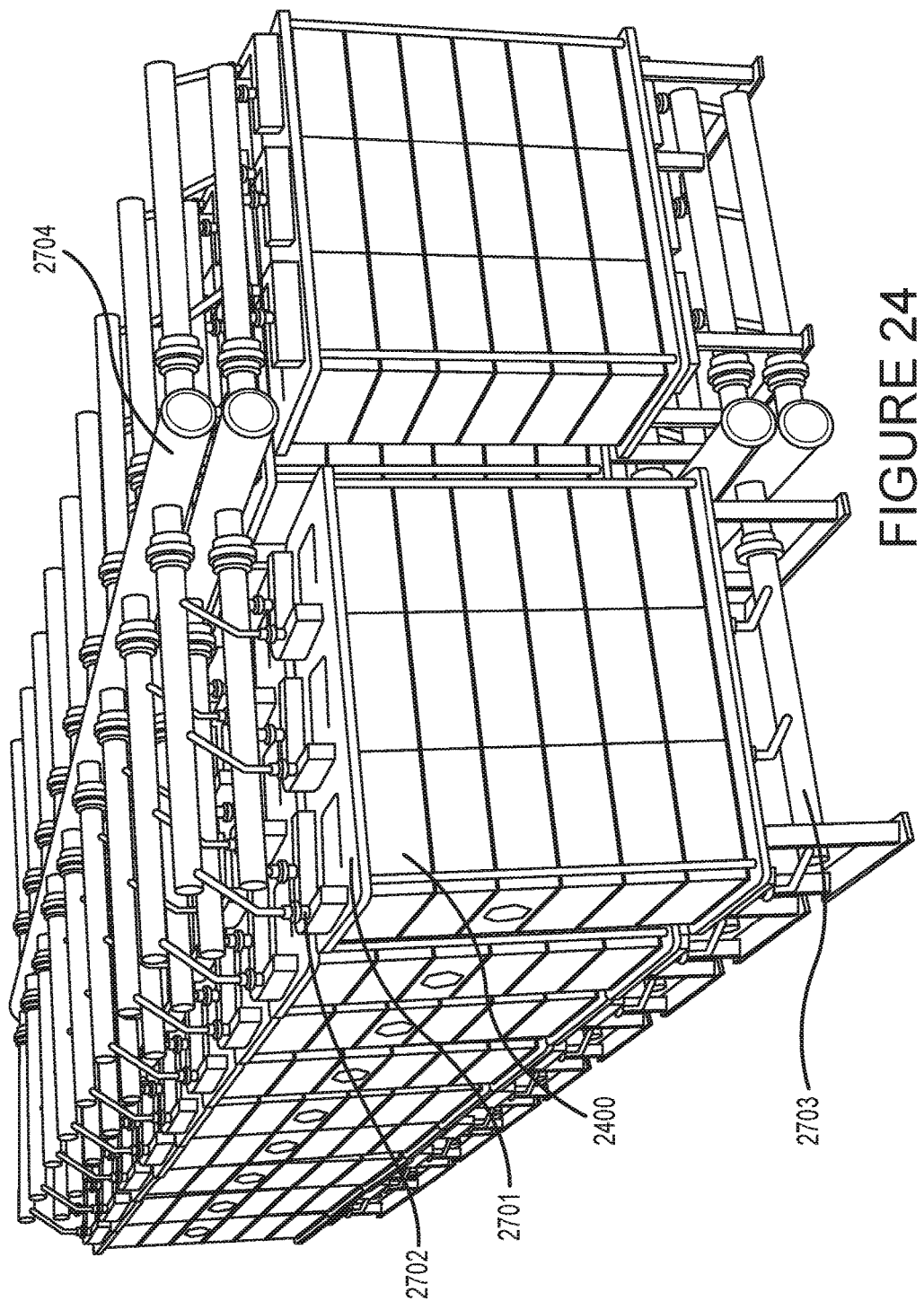
FIG. 24 is an isometric view of a skid of membrane elements, according to some embodiments.

FIG. 24 is an isometric view of a skid of membrane elements 2400, according to some embodiments. In some examples, many membrane elements 2400 may be coupled in arrays that may be suitable for operation in a large plant. Arrays may be formed by stacking membrane elements 2400 together, and creating a fluid interface between the membrane elements 2400 the array. The fluid interface may be in series, parallel, or combinations thereof. One or more stacks may be combined in a common frame 2701 to provide rigid endplates and mechanical support. A top fluid interface 2702 and a bottom fluid interface 2703 may provide a fluid interface between different stacks, thereby providing a fluid interface for the entire array. In addition, skids including multiple arrays may be provided. The skid may be a standalone module, and may provide pumps for one or more fluids and controls to run efficiently. Additionally, leak detection may be included at the skid level. The skid may have headers that may couple each array in parallel. Modules may be isolated and removed from the skid for maintenance. In some examples, many skids may be used to operate a large plant.

Examples of membranes, elements, modules, and/or stacks described herein may generally be used to perform forward osmosis. Forward osmosis generally refers to a process whereby a solute in a draw solution is greater than a solute in a feed solution. Water traverses the forward osmosis membrane, generally from the feed to the draw solution, decreasing the concentration of solute in the draw. Any number of solutes may be manipulated using membranes, devices, and systems described herein including, but not limited to salts. Any number of fluids may be used to implement the feed and draw fluids, including, but not limited to, water, industrial waste, commercial waste, agricultural waste, and beverages. Pressure retarded osmosis generally refers to a process whereby energy or pressure is generated by fluid transport driven by the osmotic pressure difference between a feed solution and a draw solution. The feed solution may be wastewater or river water and the draw solution may be seawater or reverse osmosis brine. Membrane distillation generally refers to a process whereby fluid from a liquid feed solution at a high temperature passes through a membrane as vapor and condenses to a permeate solution at a lower temperature. The feed may be waste water, seawater, or any solution of high salt concentration.

Example Performance

Example performance metrics achieved using examples of membrane plate assemblies described herein are provided below. The example metrics are provided by way of example and to facilitate an understanding of example performance achievable using assemblies described herein. The examples provided are not the only performance metrics achievable, and not all embodiments may achieve xe described performance.

TABLE 1

Performance of Porifera's Gen 1 membrane plate assembly.

| | |
|---|---|
| Membrane area per element | 7.0 m2 |
| Membrane Type | Forward osmosis |
| Operational pH limits | 2-11 |
| Water processed by element with 5.5 wt % NaCl draw vs. water (FO mode) | 190-240 L/h |
| Reverse salt flux of element | 0.2-0.6 g/L |
| Water processed by element with 5.5 wt % NaCl draw vs. 3.25% NaCl (FO mode) | 65-75 L/h |
| Feed spacer | 0.030" Fishnet |
| Head loss | 0.03 psi/gpm |
| Element volume, including housing | 0.03 m3 |
| Physical dimensions | 16" × 18" × 7" |
| Weight (wet) | 72 lbs |
| Materials | Plastic & Aluminum |
| Plumbing Interface | Porifera Quick Change Manifold |

TABLE 2

Performance of Porifera's Gen 1 membrane plate assembly in FO mode with different flow rates using 300 TDS Feed and 1M NaCl Draw.

| Draw Flow rates (gpm) | Feed Flow rates (gpm) | Flux at 25 C. (LMH) | RSF (g/L) | Draw Head Loss (psi) | Feed Head Loss (psi) |
|---|---|---|---|---|---|
| 2.0 | 2.0 | 21.9 | 0.46 | 0 | 0.9 |
| 4.0 | 4.0 | 25.3 | 0.39 | 0 | 1.2 |
| 6.0 | 6.0 | 26.7 | 0.39 | 0.3 | 1.5 |
| 8.0 | 8.0 | 27.3 | 0.31 | 0.7 | 2.1 |
| 10.0 | 10.0 | 28.0 | 0.35 | 1.2 | 2.1 |

TABLE 3

Packing Density of Porifera's Elements compared to commercial RO and FO elements.

| Element | Area (m$^2$) | Packing Density (m$^2$/m$^3$) |
|---|---|---|
| RO 4040 7 m$^2$ | 7 | 263.7 |
| RO 8040 - 41 m$^2$ | 41 | 569.2 |
| Porifera's Gen 2 - 80 m$^2$ | 80 | 615.0 |
| Porifera's Gen 1 - 7 m$^2$ | 7 | 233.0 |
| Commercial FO 8040 - 17 m$^2$ | 17 | 236.0 |
| Commercial FO 4040 - 3 m$^2$ | 3 | 113.0 |
| Commercial FO 4040 - 1.2 m$^2$ | 1.20 | 45.2 |

From the foregoing it will be appreciated that, although specific embodiments of the invention have been described herein for purposes of illustration, various modifications may be made without deviating from the spirit and scope of the invention.

What is claimed is:

1. A spacer plate for a filtration membrane assembly, the spacer plate comprising:
    a rigid body defining:
        a first surface on a first side of the rigid body;
        a second surface on a second side of the rigid body;
        a peripheral surface extending between the first surface and the second surface;
        a spacing region within the peripheral surface;
        at least a first opening connected to the spacing region,
        at least a second opening connected to the spacing region,
        a first membrane bonding area on the first surface, the first membrane bonding area being defined by one or more projections or depressions on the first surface; and
        a second membrane bonding area on the second surface, the second membrane bonding area being defined by one or more projections or depressions on the second surface, the second membrane bonding area being laterally offset from the first membrane bonding area.

2. The spacer plate of claim 1, further comprising a first membrane bonded to the first surface at the first bonding area and a second membrane bonded to the second surface at the second bonding area.

3. The spacer plate of claim 2, wherein the first opening is in fluid communication with a region between the first and second membranes and at least partially defines a first flow path.

4. The spacer plate of claim 3, wherein the second opening is in fluid communication with a region outside of the first and second membranes.

5. The spacer plate of claim 1, further comprising a separating sheet extending across the spacing region and at least partially defining the first surface and the second surface.

6. The spacer plate of claim 5, wherein the separating sheet includes one or more protrusions, cavities, textures, or combinations of any of the foregoing, extending therefrom or therein.

* * * * *